United States Patent
Guo et al.

(10) Patent No.: US 12,107,689 B2
(45) Date of Patent: Oct. 1, 2024

(54) INFORMATION TRANSMISSION METHOD, COMMUNICATION APPARATUS, COMPUTER-READABLE STORAGE MEDIUM, AND CHIP

(71) Applicant: HUAWEI TECHNOLOGIES CO., LTD., Guangdong (CN)

(72) Inventors: Yuchen Guo, Shenzhen (CN); Ming Gan, Shenzhen (CN); Jian Yu, Shenzhen (CN); Mengshi Hu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/352,279

(22) Filed: Jul. 14, 2023

(65) Prior Publication Data

US 2023/0361941 A1    Nov. 9, 2023

Related U.S. Application Data

(63) Continuation of application No. PCT/CN2022/089647, filed on Apr. 27, 2022.

(30) Foreign Application Priority Data

Apr. 29, 2021 (CN) .......................... 202110475032.7
May 14, 2021 (CN) .......................... 202110528169.4

(51) Int. Cl.
*H04L 1/1829* (2023.01)
*H04L 1/1867* (2023.01)
*H04W 84/12* (2009.01)

(52) U.S. Cl.
CPC .......... *H04L 1/1861* (2013.01); *H04L 1/1893* (2013.01); *H04W 84/12* (2013.01)

(58) Field of Classification Search
CPC ... H04W 28/04; H04W 72/04; H04W 72/042; H04W 88/08; H04W 84/12; H04L 5/0007; H04L 1/1861; H04L 1/1893
(Continued)

(56) References Cited

U.S. PATENT DOCUMENTS

| | | | | |
|---|---|---|---|---|
| 11,665,676 B2 * | 5/2023 | Nezou | .................... | H04W 72/21 370/329 |
| 2011/0194536 A1 * | 8/2011 | Kim | ....................... | H04L 5/0094 370/335 |

(Continued)

FOREIGN PATENT DOCUMENTS

| | | | | | |
|---|---|---|---|---|---|
| CN | 112600569 A | * | 4/2021 | ........... | H04L 1/0009 |
| CN | 116134900 A | * | 5/2023 | .......... | H04W 74/002 |

(Continued)

*Primary Examiner* — Peter G Solinsky
*Assistant Examiner* — Sanjay K Dewan
(74) *Attorney, Agent, or Firm* — HUAWEI TECHNOLOGIES CO., LTD.

(57) ABSTRACT

In an information transmission method, a receiving device receives a data frame from a sending device. The data frame occupies a transmission resource block, and includes RU allocation information. The receiving device determines indication information based on a location of a 160 MHz channel with more data tones of the transmission resource block and a resource block size indicated by the RU allocation information. The receiving device then determines a response resource block based on the indication information and the RU allocation information, and sends an acknowledgment frame for the data frame to the sending device on the response resource block.

20 Claims, 9 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2012/0127940 | A1* | 5/2012 | Lee | H04L 5/0053 |
| | | | | 370/329 |
| 2014/0140312 | A1* | 5/2014 | Lee | H04L 5/0091 |
| | | | | 370/329 |
| 2018/0302858 | A1 | 10/2018 | Son et al. | |
| 2019/0159245 | A1* | 5/2019 | Park | H04W 74/0833 |
| 2019/0173637 | A1* | 6/2019 | Vermani | H04L 27/2603 |
| 2023/0083654 | A1* | 3/2023 | Jang | H04L 1/18 |
| | | | | 370/329 |
| 2023/0224715 | A1* | 7/2023 | Huang | H04W 72/0457 |
| | | | | 370/329 |

FOREIGN PATENT DOCUMENTS

| | | | | |
|---|---|---|---|---|
| GB | 2567481 A * | 4/2019 | ............ | H04W 72/04 |
| GB | 2575481 A | 1/2020 | | |
| GB | 2588835 A * | 5/2021 | ............ | H04W 72/02 |
| JP | 2020-534728 A * | 11/2020 | ............ | H04W 74/04 |
| JP | WO 2021/090732 A1 * | 5/2021 | ............ | H04W 16/10 |
| JP | WO 2021/0922727 A1 * | 5/2021 | ............ | H04W 16/10 |
| WO | WO 2017/011274 A1 * | 1/2017 | ............ | H04L 27/26 |
| WO | WO 2020/011684 A1 * | 1/2020 | ............ | H04W 74/08 |
| WO | 2020182057 A1 | 9/2020 | | |
| WO | 2021047519 A1 | 3/2021 | | |
| WO | WO 2021/035406 A1 * | 3/2021 | ............ | H04W 72/02 |
| WO | WO 2021/112336 A1 * | 6/2021 | ............ | H04L 27/26 |
| WO | WO 2021/112510 A1 * | 6/2021 | ............ | H04W 76/15 |

\* cited by examiner

INFORMATION TRANSMISSION METHOD, COMMUNICATION APPARATUS, COMPUTER-READABLE STORAGE MEDIUM, AND CHIP

CROSS-REFERENCE TO RELATED APPLICATION

This application is a continuation of International Application PCT/CN2022/089647, filed on Apr. 27, 2022, which claims priority to Chinese Patent Application 202110528169.4, filed on May 14, 2021, which claims priority to Chinese Patent Application 202110475032.7, filed on Apr. 29, 2021. The aforementioned priority patent applications are hereby incorporated by reference in their entirety.

TECHNICAL FIELD

The present disclosure relates to the communication field, and more specifically, to an information transmission method, a communication apparatus, a computer-readable storage medium, and a chip.

BACKGROUND 802.11 standards of a wireless local area network (WLAN) system are evolving from the 802.11a/b/g, to the 802.11n, 802.11ac, 802.11ax, and 802.11be. The 802.11ax standard is referred to as high efficiency (HE), the 802.11be standard is referred to as extremely high throughput (EHT), and standards later than the 802.11be standard are indicated by EHT+.

When sending a data frame to a station, a current access point notifies, through resource unit allocation, the station of a resource unit to be occupied for sending an acknowledgment frame. However, with expansion of bandwidths of available channels, in a current solution, the station cannot determine a specific channel on which the acknowledgment frame is sent. This solution is not perfect.

SUMMARY

Embodiments of this application provide a solution for correctly sending an acknowledgment frame by a receiving device.

According to a first aspect, an information transmission method is provided. The method includes: A receiving device receives a data frame from a sending device. The data frame occupies a transmission resource block, and includes RU allocation information. The receiving device determines a response resource block based on the transmission resource block and the RU allocation information. The receiving device sends an acknowledgment frame for the data frame to the sending device on the response resource block.

In this way, in this embodiment of the present disclosure, the receiving device determines the response resource block for sending the acknowledgment frame based on the transmission resource block and the RU allocation information, so that the receiving device can correctly send the acknowledgment frame, ensuring information transmission efficiency.

In some embodiments of the first aspect, the determining a response resource block based on the transmission resource block and the RU allocation information includes: if a bandwidth of the transmission resource block is greater than a bandwidth threshold, determining a response channel based on a preset rule; and determining the response resource block based on the response channel and the RU allocation information.

In some embodiments of the first aspect, the response channel includes at least one of the following: a primary 160 MHz channel, a secondary 160 MHz channel, a high 160 MHz channel, a low 160 MHz channel, or a 160 MHz channel with more data tones of the transmission resource block.

In some embodiments of the first aspect, the determining a response channel based on a preset rule includes: determining, based on an extremely high throughput signal EHT-SIG field of the data frame, that the data frame is transmitted in multi-user multiple-input multiple-output MU-MIMO mode; determining a location of the receiving device in a MU-MIMO user group based on an identifier of the receiving device in the EHT-SIG field; and determining the response channel based on the location.

In some embodiments of the first aspect, the determining the response channel based on the location includes: if the location is a predetermined location, determining that the response channel is a first 160 MHz channel; and if the location is a non-predetermined location, determining that the response channel is a second 160 MHz channel. The second 160 MHz channel is different from the first 160 MHz channel.

In some embodiments of the first aspect, the predetermined location is at least one of the following: an odd location, an even location, a first half location, or a second half of locations.

In some embodiments of the first aspect, the first 160 MHz channel is a primary 160 MHz channel or a secondary 160 MHz channel.

In some embodiments of the first aspect, the first 160 MHz channel is a high 160 MHz channel or a low 160 MHz channel.

In this way, in this embodiment of the present disclosure, the receiving device can determine the response channel based on the preset rule. In addition, different receiving devices at different locations in a same MU-MIMO group may determine different response channels. In this way, each channel of a total bandwidth can be fully utilized, resource utilization is optimized, and transmission efficiency of the acknowledgment frame is ensured.

In some embodiments of the first aspect, the transmission resource block is at least one of the following: a 2×996+484-tone MRU, a 3×996-tone MRU, a 3×996+484-tone MRU, or a 4×996-tone RU.

According to a second aspect, an information transmission method is provided. The method includes: A sending device sends a data frame to a receiving device. The data frame occupies a transmission resource block, and includes RU allocation information. The sending device determines a response resource block based on the transmission resource block and the RU allocation information. The sending device receives an acknowledgment frame for the data frame from the receiving device on the response resource block.

In some embodiments of the second aspect, the determining a response resource block based on the transmission resource block and the RU allocation information includes: if a bandwidth of the transmission resource block is greater than a bandwidth threshold, determining a response channel based on a preset rule; and determining the response resource block based on the response channel and the RU allocation information.

In some embodiments of the second aspect, the response channel includes at least one of the following: a primary 160 MHz channel, a secondary 160 MHz channel, a high 160 MHz channel, a low 160 MHz channel, or a 160 MHz channel with more data tones of the transmission resource block.

In some embodiments of the second aspect, the determining a response channel based on a preset rule includes: determining, based on an extremely high throughput signal EHT-SIG field of the data frame, that the data frame is transmitted in multi-user multiple-input multiple-output MU-MIMO mode; determining a location of the receiving device in a MU-MIMO user group based on an identifier of the receiving device in the EHT-SIG field; and determining the response channel based on the location.

In some embodiments of the second aspect, the determining the response channel based on the location includes: if the location is a predetermined location, determining that the response channel is a first 160 MHz channel; and if the location is a non-predetermined location, determining that the response channel is a second 160 MHz channel. The second 160 MHz channel is different from the first 160 MHz channel.

In some embodiments of the second aspect, the predetermined location is at least one of the following: an odd location, an even location, a first half location, or a second half of locations.

In some embodiments of the second aspect, the first 160 MHz channel is a primary 160 MHz channel or a secondary 160 MHz channel.

In some embodiments of the second aspect, the first 160 MHz channel is a high 160 MHz channel or a low 160 MHz channel.

In some embodiments of the second aspect, the transmission resource block is at least one of the following: a 2×996+484-tone MRU, a 3×996-tone MRU, a 3×996+484-tone MRU, or a 4×996-tone RU.

According to a third aspect, a communication apparatus is provided. The apparatus includes: a receiving unit, configured to receive a data frame from a sending device, where the data frame occupies a transmission resource block, and includes resource unit RU allocation information; a determining unit, configured to determine a response resource block based on the transmission resource block and the RU allocation information; and a sending unit, configured to send an acknowledgment frame for the data frame to the sending device on the response resource block.

In some embodiments of the third aspect, the determining unit includes: a first determining subunit, configured to: if a bandwidth of the transmission resource block is greater than a bandwidth threshold, determine a response channel based on a preset rule; and a second determining subunit, configured to determine the response resource block based on the response channel and the RU allocation information.

In some embodiments of the third aspect, the response channel includes at least one of the following: a primary 160 MHz channel, a secondary 160 MHz channel, a high 160 MHz channel, a low 160 MHz channel, or a 160 MHz channel with more data tones of the transmission resource block.

In some embodiments of the third aspect, the first determining subunit is configured to: determine, based on an extremely high throughput signal EHT-SIG field of the data frame, that the data frame is transmitted in multi-user multiple-input multiple-output MU-MIMO mode; determine a location of the receiving device in a MU-MIMO user group based on an identifier of the receiving device in the EHT-SIG field; and determine the response channel based on the location.

In some embodiments of the third aspect, the first determining subunit is configured to: if the location is a predetermined location, determine that the response channel is a first 160 MHz channel; and if the location is a non-predetermined location, determine that the response channel is a second 160 MHz channel. The second 160 MHz channel is different from the first 160 MHz channel.

In some embodiments of the third aspect, the predetermined location is at least one of the following: an odd location, an even location, a first half location, or a second half of locations.

In some embodiments of the third aspect, the first 160 MHz channel is a primary 160 MHz channel or a secondary 160 MHz channel.

In some embodiments of the third aspect, the first 160 MHz channel is a high 160 MHz channel or a low 160 MHz channel.

In some embodiments of the third aspect, the transmission resource block is at least one of the following: a 2×996+484-tone MRU, a 3×996-tone MRU, a 3×996+484-tone MRU, or a 4×996-tone RU.

According to a fourth aspect, a communication apparatus is provided. The apparatus includes: a sending unit, configured to send a data frame to a receiving device, where the data frame occupies a transmission resource block, and includes resource unit RU allocation information; a determining unit, configured to determine a response resource block based on the transmission resource block and the RU allocation information; and a receiving unit, configured to receive an acknowledgment frame for the data frame from the receiving device on the response resource block.

In some embodiments of the fourth aspect, the determining unit includes: a first determining subunit, configured to: if a bandwidth of the transmission resource block is greater than a bandwidth threshold, determine a response channel based on a preset rule; and a second determining subunit, configured to determine the response resource block based on the response channel and the RU allocation information.

In some embodiments of the fourth aspect, the response channel includes at least one of the following: a primary 160 MHz channel, a secondary 160 MHz channel, a high 160 MHz channel, a low 160 MHz channel, or a 160 MHz channel with more data tones of the transmission resource block.

In some embodiments of the fourth aspect, the first determining subunit is configured to: determine, based on an extremely high throughput signal EHT-SIG field of the data frame, that the data frame is transmitted in multi-user multiple-input multiple-output MU-MIMO mode; determine a location of the receiving device in a MU-MIMO user group based on an identifier of the receiving device in the EHT-SIG field; and determine the response channel based on the location.

In some embodiments of the fourth aspect, the first determining subunit is configured to: if the location is a predetermined location, determine that the response channel is a first 160 MHz channel; and if the location is a non-predetermined location, determine that the response channel is a second 160 MHz channel. The second 160 MHz channel is different from the first 160 MHz channel.

In some embodiments of the fourth aspect, the predetermined location is at least one of the following: an odd location, an even location, a first half location, or a second half of locations.

In some embodiments of the fourth aspect, the first 160 MHz channel is a primary 160 MHz channel or a secondary 160 MHz channel.

In some embodiments of the fourth aspect, the first 160 MHz channel is a high 160 MHz channel or a low 160 MHz channel.

In some embodiments of the fourth aspect, the transmission resource block is at least one of the following: a 2×996+484-tone MRU, a 3×996-tone MRU, a 3×996+484-tone MRU, or a 4×996-tone RU.

According to a fifth aspect, a communication apparatus is provided and includes a transceiver, a processor, and a memory. The memory stores instructions executed by the processor; and when the instructions are executed by the processor, the apparatus is enabled to perform the following operations: receive a data frame from a sending device by using the transceiver, where the data frame occupies a transmission resource block, and includes RU allocation information; determine a response resource block based on the transmission resource block and the RU allocation information; and send an acknowledgment frame for the data frame to the sending device on the response resource block by using the transceiver.

In some embodiments of the fifth aspect, the processor executes the instructions, so that the apparatus performs the following operations: if a bandwidth of the transmission resource block is greater than a bandwidth threshold, determine a response channel based on a preset rule; and determine the response resource block based on the response channel and the RU allocation information.

In some embodiments of the fifth aspect, the response channel includes at least one of the following: a primary 160 MHz channel, a secondary 160 MHz channel, a high 160 MHz channel, a low 160 MHz channel, or a 160 MHz channel with more data tones of the transmission resource block.

In some embodiments of the fifth aspect, the processor executes the instructions, so that the apparatus performs the following operations: determine, based on an extremely high throughput signal EHT-SIG field of the data frame, that the data frame is transmitted in multi-user multiple-input multiple-output MU-MIMO mode; determine a location of the receiving device in a MU-MIMO user group based on an identifier of the receiving device in the EHT-SIG field; and determine the response channel based on the location.

In some embodiments of the fifth aspect, the processor executes the instructions, so that the apparatus performs the following operations: if the location is a predetermined location, determine that the response channel is a first 160 MHz channel; and if the location is a non-predetermined location, determine that the response channel is a second 160 MHz channel. The second 160 MHz channel is different from the first 160 MHz channel.

In some embodiments of the fifth aspect, the predetermined location is at least one of the following: an odd location, an even location, a first half location, or a second half of locations.

In some embodiments of the fifth aspect, the first 160 MHz channel is a primary 160 MHz channel or a secondary 160 MHz channel.

In some embodiments of the fifth aspect, the first 160 MHz channel is a high 160 MHz channel or a low 160 MHz channel.

In some embodiments of the fifth aspect, the transmission resource block is at least one of the following: a 2×996+484-tone MRU, a 3×996-tone MRU, a 3×996+484-tone MRU, or a 4×996-tone RU.

According to a sixth aspect, a communication apparatus is provided and includes a transceiver, a processor, and a memory. The memory stores instructions executed by the processor; and when the instructions are executed by the processor, the apparatus is enabled to perform the following operations: send a data frame to a receiving device by using the transceiver, where the data frame occupies a transmission resource block, and includes RU allocation information; determine a response resource block based on the transmission resource block and the RU allocation information; and receive an acknowledgment frame for the data frame from the receiving device on the response resource block by using the transceiver.

In some embodiments of the sixth aspect, the processor executes the instructions, so that the apparatus performs the following operations: if a bandwidth of the transmission resource block is greater than a bandwidth threshold, determine a response channel based on a preset rule; and determine the response resource block based on the response channel and the RU allocation information.

In some embodiments of the sixth aspect, the response channel includes at least one of the following: a primary 160 MHz channel, a secondary 160 MHz channel, a high 160 MHz channel, a low 160 MHz channel, or a 160 MHz channel with more data tones of the transmission resource block.

In some embodiments of the sixth aspect, the processor executes the instructions, so that the apparatus performs the following operations: determine, based on an extremely high throughput signal EHT-SIG field of the data frame, that the data frame is transmitted in multi-user multiple-input multiple-output MU-MIMO mode; determine a location of the receiving device in a MU-MIMO user group based on an identifier of the receiving device in the EHT-SIG field; and determine the response channel based on the location.

In some embodiments of the sixth aspect, the processor executes the instructions, so that the apparatus performs the following operations: if the location is a predetermined location, determine that the response channel is a first 160 MHz channel; and if the location is a non-predetermined location, determine that the response channel is a second 160 MHz channel. The second 160 MHz channel is different from the first 160 MHz channel.

In some embodiments of the sixth aspect, the predetermined location is at least one of the following: an odd location, an even location, a first half location, or a second half of locations.

In some embodiments of the sixth aspect, the first 160 MHz channel is a primary 160 MHz channel or a secondary 160 MHz channel.

In some embodiments of the sixth aspect, the first 160 MHz channel is a high 160 MHz channel or a low 160 MHz channel.

In some embodiments of the sixth aspect, the transmission resource block is at least one of the following: a 2×996+484-tone MRU, a 3×996-tone MRU, a 3×996+484-tone MRU, or a 4×996-tone RU.

According to a seventh aspect, an access point is provided. The access point (AP) includes the apparatus according to any one of the fourth aspect or the sixth aspect or the implementations of the fourth aspect or the sixth aspect.

According to an eighth aspect, a station is provided. The station (STA) includes the apparatus according to any one of the third aspect or the fifth aspect or the implementations of the third aspect or the fifth aspect.

According to a ninth aspect, a computer-readable storage medium is provided. The computer-readable storage medium stores a computer program, and when the computer program is executed by a processor, operations of the method in any embodiment of the first aspect or the second aspect are implemented.

According to a tenth aspect, a chip or a chip system is provided. The chip or the chip system includes a processing circuit, and is configured to implement operations of the method in any embodiment of the first aspect or the second aspect.

According to an eleventh aspect, a computer program or a computer program product is provided. The computer program or the computer program product is tangibly stored on a computer-readable medium and includes computer executable instructions. When the computer executable instructions are executed, a device is enabled to implement operations of the method in any embodiment of the first aspect or the second aspect.

According to a twelfth aspect, a wireless communication system is provided. The system includes a sending device and a receiving device. The sending device may implement operations of the information transmission method in any embodiment of the first aspect, and the receiving device may implement operations of the information transmission method in any embodiment of the second aspect.

According to a thirteenth aspect, a wireless communication system is provided. The system includes at least one AP and at least one STA. Any AP or any STA may implement operations of the information transmission method in any embodiment of the first aspect or the second aspect.

BRIEF DESCRIPTION OF DRAWINGS

With reference to the accompanying drawings and the following detailed descriptions, features, advantages, and other aspects of the implementations of the present disclosure become more apparent. Several implementations of the present disclosure are shown herein by way of example but not limitation. In the accompanying drawings, details are as follows.

DESCRIPTION OF EMBODIMENTS

Figure 1:
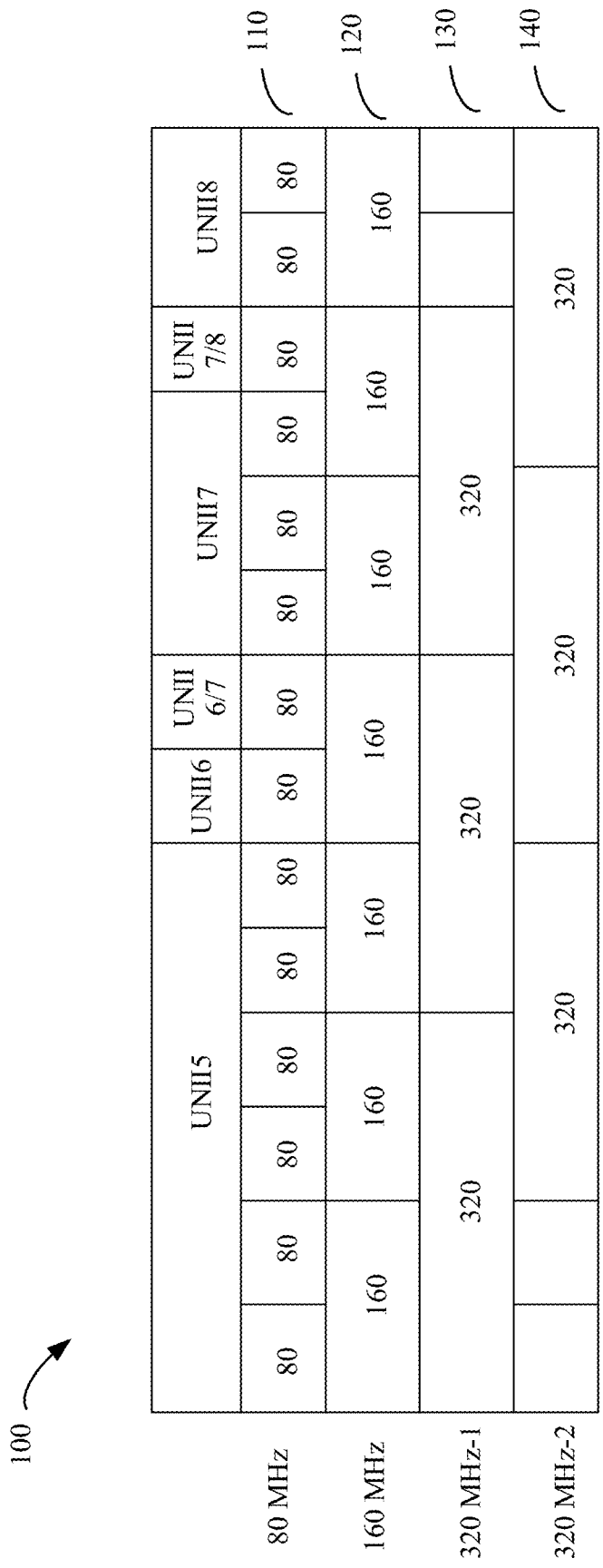
FIG. 1 is a schematic diagram of division 100 of a 320 MHz channel.

The following describes embodiments of the present disclosure in detail with reference to the accompanying drawings. Although some embodiments of the present disclosure are shown in the accompanying drawings, it should be understood that the present disclosure may be implemented in various forms, and should not be construed as being limited to the embodiments described herein. On the contrary, Rather, these embodiments are provided so that the present disclosure will be thoroughly and completely understood. It should be understood that the accompanying drawings and embodiments of the present disclosure are only used as examples, but are not intended to limit the protection scope of the present disclosure.

In descriptions of embodiments of the present disclosure, the term "include" and similar terms thereof should be understood as open inclusion, that is, "include but are not limited to". The term "based" should be understood as "at least partially based". The terms "one embodiment" or "the embodiment" should be understood as "at least one embodiment". The terms "first", "second", and the like may indicate different or same objects.

In the context of the present disclosure, the term "wireless communication system" may be, for example, a wide area network system or a wireless local area network (WLAN) system. The wireless communication system may support a plurality of WLAN communication protocols, for example, the 802.11ac/802.11ax/802.11be in the Institute of Electrical and Electronics Engineers (IEEE) 802.11 series protocols, or any protocol in future IEEE 802.11 series. For ease of description, embodiments of this application use the WLAN as an example for description. The WLAN may include a plurality of basic service sets (BSSs). A node in the basic service set includes an access point station and a non-access point station (Non-AP STA).

The term "access point (Access Point, AP)" may also be referred to as the access point station. The AP is an apparatus having a wireless transceiver function, and may provide a service for the station. The AP may also be referred to as a wireless access point, a hotspot, or the like. The AP is an access point used by a mobile user to access a wired network, and is mainly deployed in a home, inside a building, and inside a campus, with a typical coverage radius of tens of meters to hundreds of meters. Certainly, the AP may alternatively be deployed outdoors. The AP is equivalent to a bridge connecting a wired network and a wireless network. Main functions of the AP are to connect STAs together and then connect the wireless network to the wired network. Optionally, the AP may be a terminal device or a network device with a wireless fidelity (Wi-Fi) chip. For example, the AP may be a communication server, a router, a switch, or a bridge. Optionally, the AP may be a device that supports the 802.11 standard in the current network system or the future network system.

The term "station (STA)" may be an apparatus having a wireless transceiver function, and may access a wireless local area network based on an access point. The STA may be a wireless communication chip, a wireless sensor, or a wireless communication terminal. For example, the STA may also be referred to as a system, a subscriber unit, an access terminal, a mobile station, a remote station, a remote terminal, a mobile device, a user terminal, a terminal, a wireless communication device, a user agent, a user apparatus, or user equipment (UE). The STA may be a wireless communication chip, a wireless sensor, or a wireless communication terminal. For example, the STA is a mobile phone, a tablet computer, a set-top box, a smart television set, a smart wearable device, a vehicle-mounted communication device, a computer that supports a Wi-Fi communication function, and the like. Optionally, the STA may be a device that supports the 802.11 standard in the current network system or a future network system.

The term "orthogonal frequency division multiplexing (Orthogonal Frequency Division Multiplexing, OFDM)" is a basic transmission mode of current wireless communication, and is widely applied to various wireless communication systems. In addition, the OFDM is further applied to fixed network transmission, for example, transmission modes such as an optical fiber, a copper twisted wire, and a cable. A basic principle of the OFDM is to minimize a subcarrier spacing within an allowable range based on subcarrier orthogonality. This can ensure that a plurality of parallel paths that do not interfere with each other are formed while improving frequency utilization efficiency of a system. Further, because OFDM has the foregoing features, if subcarriers of OFDM that do not interfere with each other are allocated to a plurality of users, multi-user access or data transmission can be implemented by using the OFDM. This is orthogonal frequency division multiple access (OFDMA). The OFDMA can be used for concurrent transmission of multi-user data, and is an effective way to improve data transmission concurrency.

The term "multiple input multiple output (MIMO) technology" is a technology that can use a plurality of antennas to generate additional spatial degree of freedom, to multiply a system throughput and effectively improve a rate of a communication system. In addition, a transmit end may send data to a plurality of users over a plurality of spatial streams, to implement concurrent transmission of multi-user (MU) data and improve data transmission concurrency, which may also be referred to as MU-MIMO.

802.11 standards of a WLAN system are evolving from the 802.11a/b/g, to the 802.11n, 802.11ac, 802.11ax, and 802.11be. Only single user single input single output (SU-SISO) is supported in standards earlier than the 802.11n. Single user multiple input multiple output (SU-MIMO) is supported since the 802.11n. In addition, the MU-MIMO is supported since the 802.11ac and 802.11ax. OFDM transmission is supported in 802.11 standards earlier than the 802.11ax. An OFDMA technology is introduced since the 802.11ax, and an entire bandwidth may be divided into one or more resource units (RUs). The MU-MIMO and OFDMA are supported in the 802.11be that is currently under research, where an extremely high throughput multi-user physical layer protocol data unit (EHT MU PPDU) is defined.

With evolution of the WLAN 802.11, a transmission bandwidth allowed by the WLAN 802.11 is also gradually changed. A transmission bandwidth allowed by the 802.11a/g standard is 20 MHz, a transmission bandwidth allowed by the 802.11n standard is 20 MHz or 40 MHz, a transmission bandwidth allowed by the 802.11ax standard is 20 MHz, 40 MHz, 80 MHz, or 160 MHz, and a bandwidth supported by the 802.11be standard is expanded to 320 MHz. In this case, a peak throughput can be significantly improved, and a transmission rate can be further improved.

FIG. 1 is a schematic diagram of division 100 of a 320 MHz channel. Specifically, FIG. 1 shows channel division of an unlicensed international information infrastructure (U-NII) radio frequency band in the 6 GHz frequency band. FIG. 1 shows an 80 MHz bandwidth 110, a 160 MHz bandwidth 120, a 320 MHz-1 bandwidth 130, and a 320 MHz-2 bandwidth 140. It may be understood that, to effectively use the channel, two 320 MHz channels are designed: the 320 MHz-1 with a channel center frequency of 31/95/159 and the 320 MHz-2 with a channel center frequency of 63/127/191, which are respectively shown as 130 and 140 in FIG. 1.

It may be understood that FIG. 1 shows the 320 MHz bandwidth. In another scenario, the bandwidth may be another value. For example, the bandwidth may be expanded to a larger value, for example, 480 MHz, 640 MHz, or another value, in an evolved extremely high throughput that may be developed in the future.

In a WLAN, channels are generally classified into a primary channel and a secondary channel. In an entire bandwidth range (for example, the 320 MHz), an AP selects a 20 MHz channel as the primary channel. An 80 MHz channel including the primary channel is referred to as a primary 80 MHz channel, and another 80 MHz channel is a non-primary 80 MHz channel, or is referred to as a secondary 80 MHz channel or a secondary 80 MHz channel. A 160 MHz channel including the primary channel is referred to as a primary 160 MHz channel, and another 160 MHz channel is a non-primary 160 MHz channel, or is referred to as a secondary 160 MHz channel or a secondary 160 MHz channel. For example, a location of the primary 80 MHz channel (or the primary 160 MHz channel) may be selected by the AP when the AP establishes a basic service set (BSS). The AP may send the location in a broadcast manner by using a beacon frame, to notify all STAs.

In current multi-user transmission, the AP may send data of a plurality of STAs carried in a PPDU. After receiving the data, the STA may send an acknowledgment frame to the AP based on triggered response scheduling (TRS) information carried in a data frame. However, when the bandwidth is greater than 160 MHz (for example, 320 MHz), the STA cannot determine a specific channel on which the acknowledgment frame is transmitted. Therefore, a current solution is not perfect.

This embodiment of this application provides an information transmission solution. In this solution, a specific RU or specific RUs on a specific channel is or are used to send the acknowledgment frame can be determined based on a transmission resource block occupied by the data frame and RU allocation information in the data frame, to ensure transmission correctness. The following describes embodiments of the present disclosure in detail by using FIG. 2 to FIG. 12.

Figure 2:
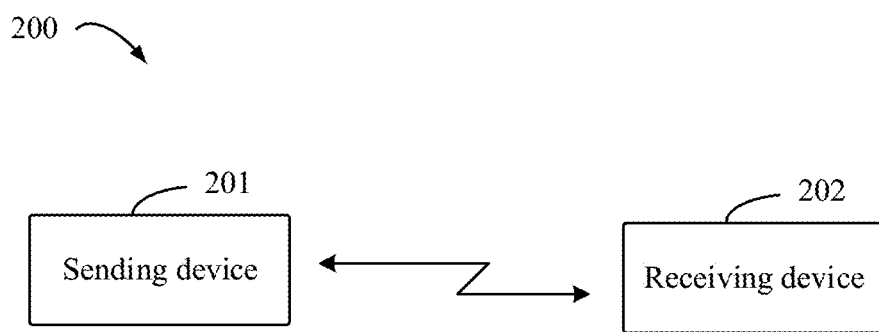
FIG. 2 is a schematic diagram of a communication system 200 to which an embodiment of the present disclosure is applicable.

FIG. 2 is a schematic diagram of a communication system 200 to which an embodiment of the present disclosure is applicable. As shown in FIG. 2, the system 200 includes a sending device 201 and a receiving device 202. The sending device 201 may communicate with the receiving device 202 by using a wireless network.

The sending device 201 shown in FIG. 2 may be an AP or a STA, and the receiving device 202 may be an AP or a STA. It may be understood that although FIG. 2 shows only the single sending device 201 and the single receiving device 202, this is not limited in the present disclosure. For example, the system 200 may include a plurality of receiving devices 202, and the sending device 201 may communicate with the plurality of receiving devices 202, or there is another scenario, which is not enumerated in the present disclosure.

Figure 3:
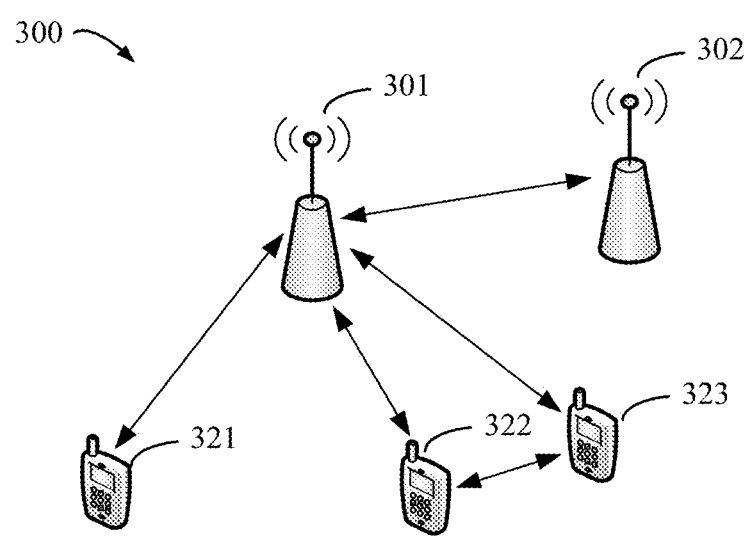
FIG. 3 is another schematic diagram of a communication system 300 to which an embodiment of the present disclosure is applicable.

FIG. 3 is another schematic diagram of a communication system 300 to which an embodiment of the present disclosure is applicable. FIG. 3 shows two APs: an AP 301 and an AP 302. FIG. 3 further shows three stations: a STA 321, a STA 322, and a STA 323. Wireless communication may be performed between the APs, between the AP and the STA, and between the STAs according to various standards. This embodiment of the present disclosure may be applied to the communication between the APs, the communication between the STAs, and the communication between the AP and the STA. For example, with reference to FIG. 3, communication may be performed between the AP 301 and the AP 302, performed between the STA 322 and the STA 323, performed between the AP 301 and the STA 321, or performed between the AP 301 and the STA 322, or the like. It should be noted that FIG. 3 is only an example, and should not be construed as a limitation on this embodiment of the present disclosure.

For ease of description, the AP 301 and the AP 302 are collectively referred to as an AP 30 below, and the STA 321, the STA 322, and the STA 323 are collectively referred to as a STA 32 below.

It should be further understood that FIG. 2 and FIG. 3 are only schematic diagrams of communication systems to which embodiments of the present disclosure is applicable. The communication system 200 and the communication system 300 may further include another network device or terminal device, for example, may further include a wireless relay device, a wireless backhaul device, and the like. In addition, a number of sending devices 201 and a number of receiving devices 202 included in the system 200, and a number of APs 30 and STAs 32 included in the system 300 are not limited in this embodiment of the present disclosure.

Figure 4:
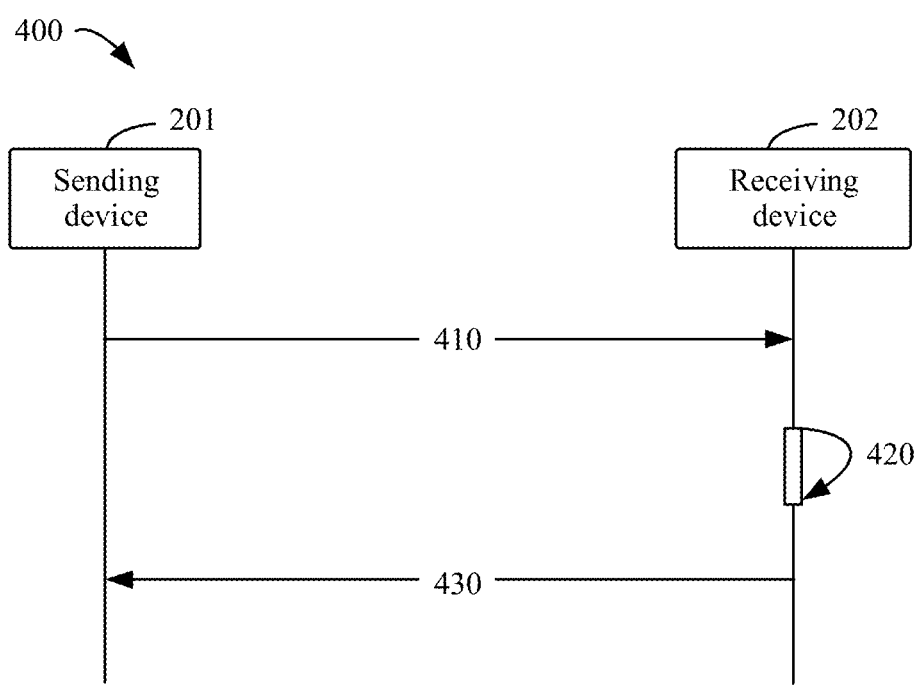
FIG. 4 is a schematic interaction diagram of an information transmission process 400 according to an embodiment of the present disclosure.

FIG. 4 is a schematic interaction diagram of an information transmission process 400 according to an embodiment of the present disclosure. The process 400 relates to the sending device 201 and the receiving device 202. It may be understood that the communication process shown in FIG. 4 is only an example rather than a limitation. In this embodiment of the present disclosure, interaction signaling that is not shown in FIG. 4 may be included, or some signaling shown in FIG. 4 is omitted.

In the process 400, the sending device 201 may first send a data frame 410 to the receiving device 202.

For example, the data frame in this embodiment of the present disclosure may occupy a transmission resource block, and a bandwidth of the transmission resource block may be greater than a bandwidth threshold. In other words, the bandwidth of the data frame in this embodiment of the present disclosure is greater than the bandwidth threshold. In some examples, the data frame may include a single MU PPDU, and a bandwidth of the single MU PPDU is greater than the bandwidth threshold. In some other examples, the data frame may include a plurality of MU PPDUs. For example, the plurality of MU PPDUs may be an aggregated PPDU obtained by aggregating the plurality of MU PPDUs, and a bandwidth of the aggregated PPDU is greater than the bandwidth threshold. For example, the bandwidth threshold may be 160 MHz, 320 MHz, or another value. This is not limited in the present disclosure.

It may be understood that the bandwidth of the data frame should not be greater than the total available bandwidth (total bandwidth for short). In an example in FIG. 1, the total bandwidth is 320 MHz. In another scenario, the total bandwidth may alternatively be another value, for example, 480 MHz. This is not limited in the present disclosure.

In this embodiment of the present disclosure, the data frame may implement separate OFDMA transmission, or may implement separate MU-MIMO transmission, or may implement OFDMA and MU-MIMO hybrid transmission. In some embodiments, a transmission type may be specified in a specific field in a physical layer format of the data frame. The specific field may be, for example, an extremely high throughput signal field (EHT-SIG).

In this embodiment of the present disclosure, a plurality of different RU types may be defined, and an entire bandwidth may be divided by the RU types. The RU type may indicate, in a form of a tone, a bandwidth occupied by the RU type. Generally, there are 242 tones in the 20 MHz bandwidth, 484 tones in the 40 MHz bandwidth, and 996 tones in the 80 MHz bandwidth.

The RU types may include a 26-tone RU, a 52-tone RU, a 106-tone RU, a 242-tone RU, a 484-tone RU, a 996-tone RU, a 2×996-tone RU, a 4×996-tone RU, and the like.

Maximum allowed quantities of different bandwidths vary with different RU types, as shown in the following table 1. Although the 4×996-tone RU is not shown in the following Table 1, it may be understood that the 4×996-tone RU corresponds to the 320 MHz bandwidth.

TABLE 1

| RU Type | 20 MHz bandwidth | 40 MHz bandwidth | 80 MHz bandwidth | 80 + 80/160 MHz bandwidth |
|---|---|---|---|---|
| 26-tone RU | 9 | 18 | 37 | 74 |
| 52-tone RU | 4 | 8 | 16 | 32 |
| 106-tone RU | 2 | 4 | 8 | 16 |
| 242-tone RU | 1 | 2 | 4 | 8 |
| 484-tone RU | Not applicable (N/A) | 1 | 2 | 4 |
| 996-tone RU | N/A | N/A | 1 | 2 |
| 2 × 996-tone RU | N/A | N/A | N/A | 1 |

The transmission resource block occupied by the data frame may have one type or a combination of a plurality of types, in other words, the transmission resource block occupied by the data frame may be an RU or a multi-RU (MRU). The MRU may be a combination of at least two RU types.

In some examples, it may be assumed that the bandwidth threshold is 160 MHz. In other words, the bandwidth occupied by the transmission resource block is greater than 160 MHz, for example, may be 320 MHz, 480 MHz, or another case.

In some embodiments, the bandwidth occupied by the transmission resource block is 320 MHz. In this case, the transmission resource block may be any one of the following: (a) a 4×996-tone RU, (b) a 2×996-tone+996-tone MRU (or denoted as a 3×996-tone MRU), (c) a 2×996-tone+484-tone MRU (or denoted as a 2×996+484-tone MRU), (d) a 2×996-tone+996-tone+484-tone MRU (or denoted as a 3×996+484-tone MRU), and the like.

In some embodiments, the bandwidth occupied by the transmission resource block is 480 MHz. In this case, the transmission resource block may be any one of the following:

(a) a 4×996-tone+996-tone MRU (or denoted as a 5×996-tone MRU), (b) a 4×996-tone+484-tone MRU (or denoted as a 4×996+484-tone MRU), (c) a 4×996-tone RU; (d) a 2×996-tone+996-tone+484-tone MRU (or denoted as a 3×996+484-tone MRU), (e) a 2×996-tone+996-tone MRU (or denoted as a 3×996-tone MRU), (f) a 2×996-tone+484-tone MRU (or denoted as a 2×996+484-tone MRU), and the like.

It should be noted that the foregoing examples are only examples, and cannot be construed as a limitation on this embodiment of the present disclosure. There may also be another RU or MRU that is not described.

Figure 5:
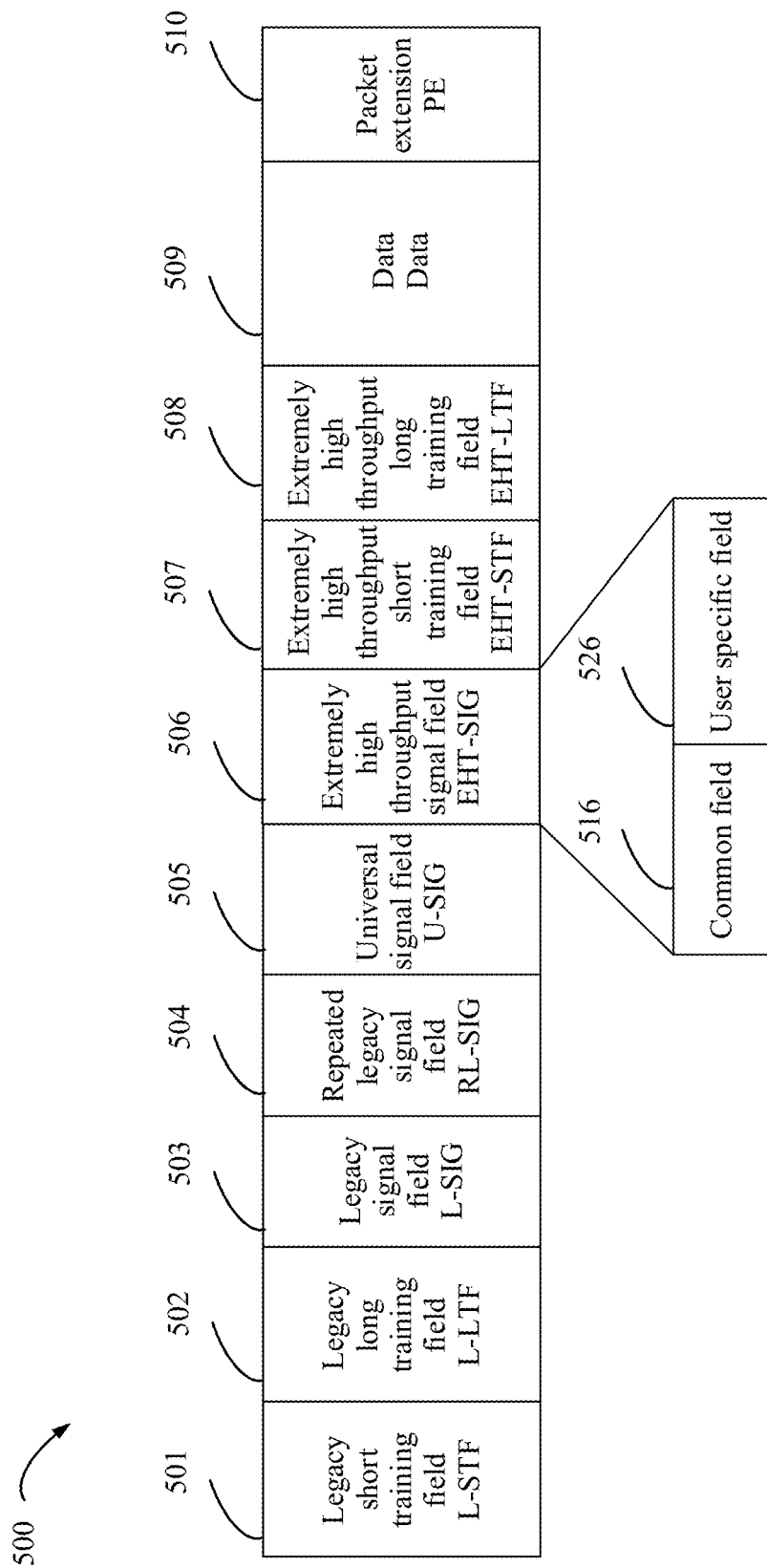
FIG. 5 is a schematic diagram of a physical layer format 500 of a data frame according to an embodiment of the present disclosure.

In some embodiments, the physical layer format of the data frame may be shown in FIG. 5.

FIG. 5 is a schematic diagram of a physical layer format 500 of a data frame according to an embodiment of the present disclosure. The format 500 includes: a legacy short training field (L-STF) 501, a legacy long training field (L-LTF) 502, a legacy signal field L-SIG 503, a repeated legacy signal (RL-SIG) field 504, a universal signal field (U-SIG) 505, an extremely high throughput signal field (EHT-SIG) 506, an extremely high throughput short training field (EHT-STF) 507, and an extremely high throughput long training field (EHT-LTF) 508. There is further a packet extension (PE) field 510 after a data field 509.

For example, the L-STF 501 may be used for PPDU discovery, coarse synchronization, automatic gain control, and the like. The L-LTF 502 may be used for fine synchronization, channel estimation, and the like. The L-SIG 503 may be used to carry signaling information related to a PPDU length, to ensure coexistence, and the like. The RL-SIG 504 indicates repetition of the L-SIG 503. The U-SIG 505 is a universal signal field that is used since EHT. The EHT-SIG 506 may carry signaling used to demodulate subsequent data, and mainly includes resource unit indication information and the like. The EHT-STF 507 may be used for automatic gain control of subsequent fields, and the like. The EHT-LTF 508 may be used for channel estimation, and the like. The Data 509 may carry data information. The PE 510 may be used to help a receiving device obtain more processing time, and the like.

As shown in FIG. 5, the EHT-SIG 506 may include a common field 516 and a user specific field 526.

For example, the common field 516 may include an RU allocation subfield, and the RU allocation subfield may include an RU (or MRU) type and a number of users in a corresponding user group.

For example, the user specific field 526 may include identifiers of a plurality of users in an RU allocation order in the RU allocation subfield.

Figure 6:
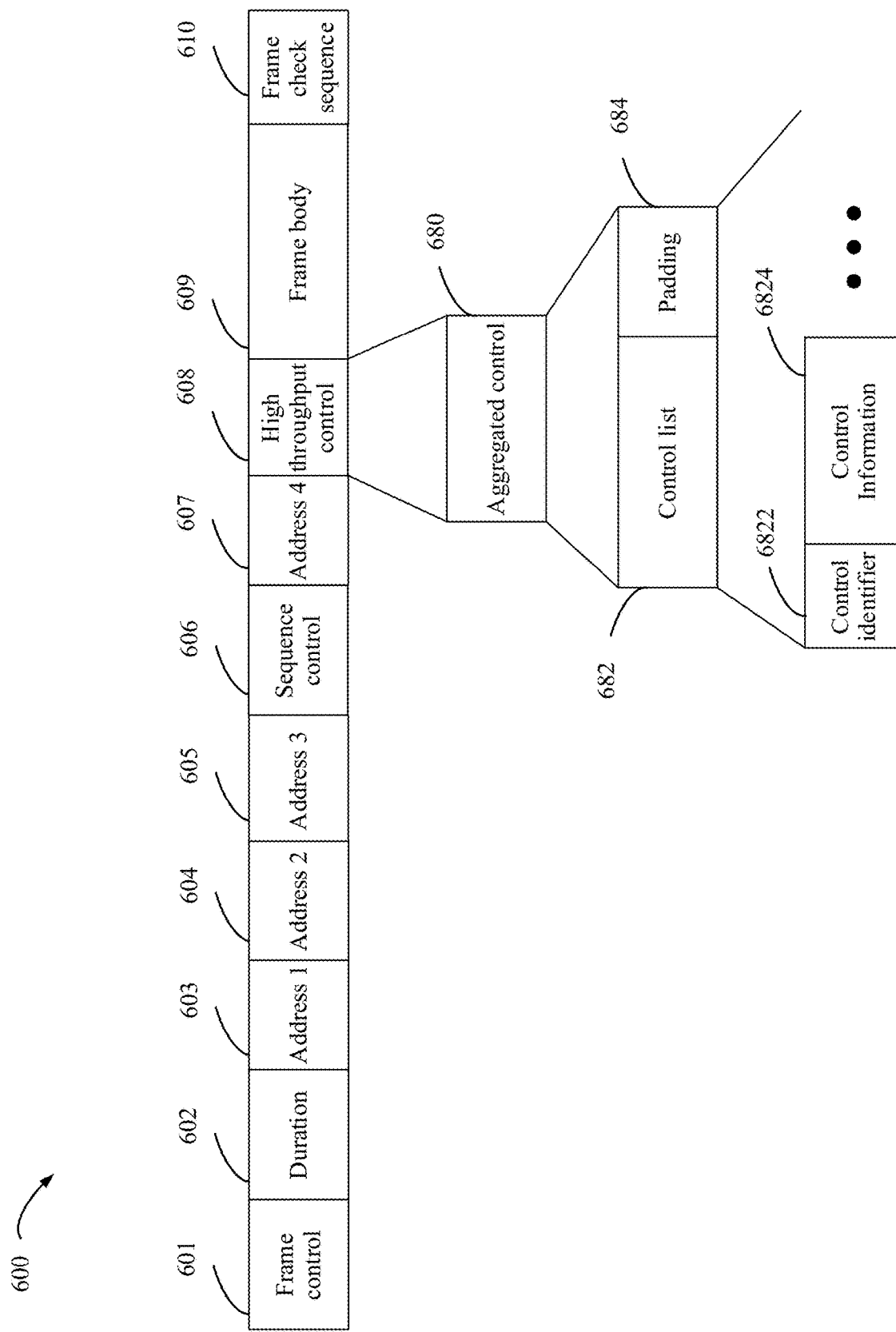
FIG. 6 is a schematic diagram of a MAC layer format 600 of a data frame according to an embodiment of the present disclosure.

In some embodiments, a media access control (MAC) layer format of the data frame may be shown in FIG. 6.

FIG. 6 is a schematic diagram of a MAC layer format 600 of a data frame according to an embodiment of the present disclosure. The format 600 includes a frame control 601, a duration 602, an address 1 603, an address 2 604, an address 3 605, a sequence control 606, an address 4607, a high throughput control (HT Control) 608, a frame body 609, and a frame check sequence (FCS) 610.

For example, the frame control 601 may include a plurality of subfields, which respectively indicate a protocol version, a frame type, a subtype, a sending direction, retransmission, power management, and the like. For example, for the frame type subfield, "10" may indicate that a frame type is a data frame. The duration 602 may indicate duration in which the data frame and the acknowledgment frame thereof occupy a channel. The address 1 603, address 2 604, address 3 605, and address 4 607 may be collectively referred to as an address field, and indicate a receiver address, a transmitter address, a source address, a destination address, or the like of the data frame. The sequence control 606 may be used to filter a repeated frame. The frame body 609 may carry specific information. The FCS 610 may be used for error detection, for example, the FCS 610 may include a 32-bit cyclic redundancy check (CRC).

For example, as shown in FIG. 6, the HT control 608 may include an aggregated control (A-Control) 680. The aggregated control may include a control list 682 and a padding 684. The control list 682 may include a control identifier (Control ID) 6822, a control information 6824, and the like.

In some embodiments of the present disclosure, when a sending device 201 sends the data frame 410, the data frame may carry TRS information. Specifically, when the control identifier 6822 is a preset value (for example, 0), the corresponding control information 6824 carries the TRS information.

Figure 7:
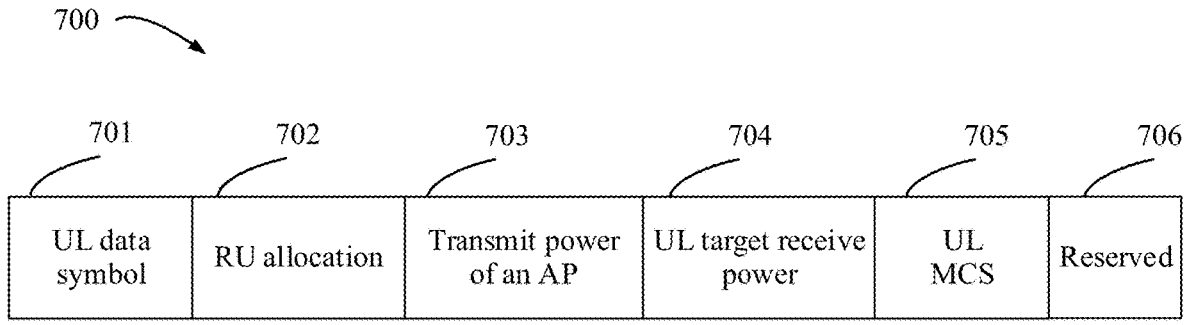
FIG. 7 is a schematic diagram of a TRS information format 700 according to an embodiment of the present disclosure.

FIG. 7 is a schematic diagram of a TRS information format 700 according to an embodiment of the present disclosure. The format 700 includes an uplink data symbol (UL Data Symbol) 701, a resource unit allocation (RU Allocation) 702, an AP transmit power (AP TX Power) 703, an uplink target receive power (UL Target Receive Power) 704, a UL modulation and coding set (UL MCS) 705, and a reserved 706.

For example, the UL data symbol 701 may indicate a length (a number of symbols) of a data part of an acknowledgment frame sent by a receiving device. The AP transmit power 703 may indicate transmit power of an AP. The UL target receive power 704 may indicate uplink receive power expected by the AP. The UL MCS 705 may indicate an MCS that is used by only the receiving device to send the acknowledgment frame. The reserved 706 may have a reserved length, such as 1 bit.

For example, the RU allocation 702 may carry RU allocation information, which indicates a frequency location that is on a transmit channel and that may be occupied by the receiving device to send the acknowledgment frame. The frequency location may be in a form of an RU or an MRU. Specifically, the RU allocation information may indicate a specific RU on a transmit channel occupied when the receiving device sends the acknowledgment frame. In the present disclosure, a transmit channel occupied when the receiving device sends the acknowledgment frame may be referred to as a "response channel", and an RU or an MRU on the transmit channel occupied when the receiving device sends the acknowledgment frame may be referred to as a "response resource block".

In some embodiments of the present disclosure, the RU allocation field 702 may be of a preset length, and indicate an RU on a preset-bandwidth channel occupied by the receiving device. The preset bandwidth may be 160 MHz. It can be learned that the RU allocation information may indicate a location of a response resource block on a 160 MHz channel.

The RU allocation information may include first indication information and second indication information. The first indication information has a first length, the second indication information has a second length, and a sum of the first length and the second length may be equal to or less than a preset length. The first indication information may indicate a specific 80 MHz channel on the preset-bandwidth channel, and the second indication information may indicate a specific RU on the corresponding 80 MHz channel.

In some implementations, the preset length may be 8 bits, the first length may be 1 bit, and the second length may be 7 bits. The first indication information may be at a location B0, and the second indication information may be at locations B1 to B7.

In some examples, if the response channel is a primary 160 MHz channel, B0 being a first value indicates a primary 80 MHz channel, and B0 being a second value indicates a secondary 80 MHz channel. Optionally, the first value is 0, and the second value is 1; or the first value is 1, and the second value is 0. In some other examples, if the response channel is a secondary 160 MHz channel, B0 being a first value indicates a low 80 MHz, and B0 being a second value indicates a high 80 MHz. Optionally, the first value is 0, and the second value is 1; or the first value is 1, and the second value is 0.

It may be understood that the implementation is only an example rather than a limitation, and other implementations that are not shown are not excluded in this embodiment of the present disclosure.

Return to the process 400. The receiving device 202 may determine a response resource block 420 based on a transmission resource block and the RU allocation information.

Specifically, when determining the response resource block 420, the receiving device 202 may first determine the response channel, and then determine the response resource block in the response channel. For example, the response channel may be determined based on a preset rule.

In some implementations, if a bandwidth of the transmission resource block is less than or equal to a bandwidth threshold, it may be determined that a channel of the transmission resource block is the response channel. For example, it is assumed that the bandwidth threshold is 160 MHz, and the bandwidth of the transmission resource block is equal to 160 MHz. If the transmission resource block is on the primary 160 MHz channel, it is determined that the response channel is also the primary 160 MHz channel. If the transmission resource block is on the secondary 160 MHz channel, it is determined that the response channel is also the secondary 160 MHz channel.

In some other implementations, if a bandwidth of the transmission resource block is less than or equal to a bandwidth threshold, the response channel may be determined based on the preset rule. Optionally, the preset rule may be at least one of the following: (1) the primary 160 MHz channel, (2) the secondary 160 MHz channel, (3) a high 160 MHz channel, (4) a low 160 MHz channel, (5) a 160 MHz channel of the transmission resource block, or (6) a 160 MHz channel corresponding to a location in a user group if a transmission mode is MU-MIMO. For descriptions of the preset rule, refer to specific embodiments in the following implementations.

In some other implementations, if a bandwidth of the transmission resource block is greater than a bandwidth threshold, the response channel may be determined based on the preset rule. The following uses an example in which the bandwidth threshold is 160 MHz for description.

In some embodiments, it is assumed that the bandwidth of the transmission resource block is equal to 320 MHz, the preset rule may be at least one of the following: (1) the primary 160 MHz channel, (2) the secondary 160 MHz channel, (3) the high 160 MHz channel, (4) the low 160 MHz channel, (5) a 160 MHz channel with more data tones of the transmission resource block.

Optionally, the primary 160 MHz channel may be used as the response channel. Alternatively, the secondary 160 MHz channel may be used as the response channel. Alternatively, the high 160 MHz channel may be used as the response channel. Alternatively, the low 160 MHz channel may be used as the response channel. It may be understood that the primary 160 MHz channel may be the high 160 MHz channel, or may be the low 160 MHz channel. Correspondingly, the secondary 160 MHz channel may be the low 160 MHz channel, or may be the high 160 MHz channel.

Optionally, the 160 MHz channel with more data tones of the transmission resource block may be used as the response channel. For example, when the transmission resource block is an MRU of a specific size, the transmission resource block is one of the following MRUs: a 3×996-tone MRU, a 2×996+484-tone MRU, or a 3×996+484-tone MRU. In this case, a 160 MHz channel on which the 2×996-tone RU is located may be used as the response channel. It may be understood that a 160 MHz channel on which the 2×996-tone RU is located may be the high 160 MHz channel, or may be the low 160 MHz channel. The 160 MHz channel on which the 2×996-tone RU is located may be the primary 160 MHz channel or the secondary 160 MHz channel.

In another implementation, a resource block on which a response frame is replied is determined based on indication information PS160 and the RU allocation field in TRS information. The indication information PS160 is determined based on a location of the 160 MHz channel with more data tones of the transmission resource block and a resource block size indicated by the RU allocation field in the TRS information. For example, the indication information PS160 is determined based on "Location of a 160 MHz channel with more data tones of a transmission resource block" in a second column and "Resource block size indicated by an RU allocation field in TRS information" in a first column of Input in the following table.

| Input | | |
|---|---|---|
| Resource block size indicated by an RU allocation field in TRS information | Location of a 160 MHz channel with more data tones of a transmission resource block | Output PS160 |
| 2 × 996 + 484-tone | Low 160 MHz channel | 0 |
| 2 × 996 + 484-tone | High 160 MHz channel | 1 |
| 3 × 996-tone or 3 × 996 + 484-tone | Low 160 MHz channel | 1 |
| 3 × 996-tone or 3 × 996 + 484-tone | High 160 MHz channel | 0 |
| 4 × 996-tone | Any | 1 |
| RU/MRU less than or equal to 2 × 996-tone | Primary 160 MHz channel | 0 |
| RU/MRU less than or equal to 2 × 996-tone | Secondary 160 MHz channel | 1 |

For example, when the resource block size indicated by the RU allocation field in the TRS information is 2×996+484-tone:

If the 160 MHz channel with more data tones of the transmission resource block is the low 160 MHz channel, it may be determined that the indication information PS160 is 0. Alternatively, if the 160 MHz channel with more data tones of the transmission resource block is the high 160 MHz channel, it may be determined that the indication information PS160 is 1. After determining the indication information PS160, a station may determine, with reference to the RU allocation field in the TRS information, a location of a resource block used to reply with the acknowledgment frame/a block acknowledgment frame. For another example, when the resource block indicated by the RU allocation field in the TRS information is the RU/MRU less than or equal to 2×996-tone: if the 160 MHz channel with more data tones of the transmission resource block is the primary 160 MHz channel, it may be determined that the PS160 indication information is 0; or if the 160 MHz channel with more data tones of the transmission resource block is the secondary 160 MHz channel, it may be determined that the PS160 indication information is 1. It should be noted that, when the resource block indicated by the RU allocation field in the TRS information is the RU/MRU less than or equal to 2×996-tone, the transmission resource block is located on only one 160 MHz channel. Therefore, a method for determining the PS160 indication information may also be as follows: If the 160 MHz channel of the transmission resource block is the primary 160 MHz channel, it may be determined that the PS160 indication information is 0. If the 160 MHz channel of the transmission resource block is the secondary 160 MHz channel, it may be determined that the PS160 indication information is 1. For example, when the resource block indicated by the RU allocation field in the TRS information is the 4×996-tone RU, the PS160 indication information is 1 regardless of a specific 160 MHz channel with more data tones of the sending resource block. After determining the indication information PS160, a station may determine, with reference to the RU allocation field in the TRS information, a location of a resource block used to reply with the acknowledgment frame/a block acknowledgment frame. In some other embodiments, it is assumed that the bandwidth of the transmission resource block is equal to 480 MHz, the preset rule may be at least one of the following: (1) the primary 160 MHz channel, (2) a secondary 160 MHz channel having a higher frequency, (3) a secondary 160 MHz channel having a lower frequency, (4) the high 160 MHz channel, (5) an intermediate 160 MHz channel, (6) the low 160 MHz channel, (7) the 160 MHz channel with more data tones of the transmission resource block.

It may be understood that the 480 MHz bandwidth may be divided into three 160 MHz channels. In an example, the three 160 MHz channels may include one primary 160 MHz channel and two secondary 160 MHz channels. In the two secondary 160 MHz channels, one has a higher frequency, and the other has a lower frequency. In another example, the three 160 MHz channels may include the high 160 MHz channel, the intermediate 160 MHz channel, and the low 160 MHz channel. Optionally, any one of the foregoing 160 MHz channels may be used as the response channel.

Optionally, the 160 MHz channel with more data tones of the transmission resource block may be used as the response channel. For example, when the transmission resource block is an MRU of a specific size, similarly, the 160 MHz channel on which the 2×996-tone RU is located may be used as the response channel. It may be understood that the 160 MHz channel on which the 2×996-tone RU is located may be the high 160 MHz channel, may be the intermediate 160 MHz channel, or may be the low 160 MHz channel.

In this way, in this implementation, the preset rule may be predetermined, so that the receiving device determines the response channel. It may be understood that different receiving devices may use different preset rules. For example, one receiving device may use the primary 160 MHz channel as a response channel, and another receiving device may use the secondary 160 MHz channel as a response channel. It can be learned that, for SU-MIMO transmission, in this implementation, each channel of a total bandwidth can be fully utilized, resource utilization is optimized, and transmission efficiency of the acknowledgment frame is ensured.

In some other implementations, for MU-MIMO transmission, determining a response channel by the receiving device 202 based on a preset rule may include: determining, based on an EHT-SIG field of a data frame, that the data frame is transmitted in MU-MIMO mode; determining a location of the receiving device 202 in a MU-MIMO user group based on an identifier (ID) of the receiving device 202 in the EHT-SIG field; and determining the response channel based on the location.

Specifically, as shown in FIG. 5, a physical layer format of the data frame includes the EHT-SIG 506, and a transmission mode of the data frame may be determined based on the common field 516 in the EHT-SIG 506. For example, an RU allocation subfield in the common field 516 may further indicate a number of users in the user group. In some examples, the number of MUs may be less than or equal to a number of spatial streams, and the number of spatial streams may indicate a maximum value of the number of MUs.

For example, the physical layer format of the data frame includes the EHT-SIG 506, and a location may be determined based on the common field 516 and the user specific field 526 in the EHT-SIG 506.

An order in which users appear in the user specific field 526 is consistent with an RU order obtained through division in a corresponding RU allocation subfield. The user may identify, by reading an ID of a receiving device in the user specific field 526, whether the user specific field 526 belongs to the user. Based on a location in which the user specific field appears and the corresponding resource unit allocation subfield, the user may learn RU allocation of the user.

For example, it is assumed that the common field 516 indicates a plurality of different tone RUs. In an example, it may be assumed that a 2×996+484-tone MRU and a 484-tone RU are included, a number of users in a user group corresponding to the 2×996+484-tone MRU is 8, and a number of users in a user group corresponding to the 484-tone RU is also 8. Optionally, a plurality of receiving devices corresponding to a same RU (or MRU) may belong to a same MU-MIMO group. For example, user groups (eight) corresponding to 2×996+484-tone MRUs are a first MU-MIMO group, and user groups (eight) corresponding to 484-tone RUs are a second MU-MIMO group. In this embodiment of the present disclosure, a location of the receiving device 202 in the MU-MIMO user group may be a location of the receiving device 202 in a MU-MIMO group to which the receiving device 202 belongs.

The receiving device 202 may determine a first location in all orders (16) based on the user specific field 526. In an example, assuming that the first location is less than or equal to 8 in all orders, for example, a fifth location, RU allocation corresponding to the receiving device 202 is the 2×996+484-tone MRU, and the location of the receiving device 202 in the MU-MIMO user group (that is, the first MU-MIMO group) to which the receiving device 202 belongs is 5. Assuming that the first location is greater than 8 in all orders, for example, a 12th location, RU allocation corresponding to the receiving device 202 is the 484-tone RU, and the location of the receiving device 202 in the MU-MIMO user group (that is, the second MU-MIMO group) to which the receiving device 202 belongs is 12−8=4.

For example, if the location is a predetermined location, it may be determined that the response channel is a first 160 MHz channel. On the contrary, if the location is a non-predetermined location, it is determined that the response channel is a second 160 MHz channel.

If the location of the receiving device 202 in the MU-MIMO group is the predetermined location, it may be determined that the response channel is the first 160 MHz channel.

In some embodiments, it is assumed that a bandwidth of the transmission resource block is equal to 320 MHz. Optionally, the first 160 MHz channel may be the primary 160 MHz channel or the secondary 160 MHz channel. Optionally, the first 160 MHz channel may be the high 160 MHz channel or the low 160 MHz channel.

In some embodiments, it is assumed that a bandwidth of the transmission resource block is equal to 480 MHz. Optionally, the first 160 MHz channel may be the primary 160 MHz channel, the secondary 160 MHz channel having a higher frequency, or the secondary 160 MHz channel having a lower frequency. Optionally, the first 160 MHz channel may be the high 160 MHz channel, the intermediate 160 MHz channel, or the low 160 MHz channel.

When the location of the receiving device 202 in the MU-MIMO group is not the predetermined location (that is, the non-predetermined location), it may be determined that the response channel is the second 160 MHz channel, and the second 160 MHz channel is different from the first 160 MHz channel.

For example, in this embodiment of the present disclosure, the predetermined location may be at least one of the following: an odd location, an even location, a first half location, or a second half of locations.

For example, it is assumed that the number of MUs in the MU-MIMO group is N, and the location of the receiving device 202 is a $P^{th}$ location in the N. Then, if P mod 2 is equal to 0 (mod indicates a remainder), in other words, P is an even number, the receiving device 202 is located in an even location. If P mod 2 is not equal to 0, the receiving device 202 is located in an odd location.

In some examples, if P≤⌊N/2⌋ (⌊ ⌋ indicates rounding down), the receiving device 202 is located in the first half location. If P>⌊N/2⌋, the receiving device 202 is located in the second half location. In such an example, if the number (N) of MUs in the MU-MIMO group is an odd number, a receiving device in the middle belongs to the second half location. In some other examples, if P≤⌈N/2⌉ (⌈ ⌉ indicates rounding up), the receiving device 202 is located in the first half location. If P>⌈N/2⌉, the receiving device 202 is located in the second half location. In such an example, if the number (N) of MUs in the MU-MIMO group is an odd number, a receiving devices in the middle belong to the first half location.

For example, assuming that the number of MUs in the MU-MIMO group is 8, and the receiving device 202 is located in a fifth location, the receiving device 202 is located in the odd location and is located in the second half location. For example, assuming that the number of MUs in the MU-MIMO group is 8, and the receiving device 202 is located in a second location, the receiving device 202 is located in the even location, and is located in the first half location.

In this way, in this implementation, the preset rule may be predetermined, so that the receiving device determines the response channel. In addition, different receiving devices in a same MU-MIMO group may determine different response channels. For example, receiving devices (a first receiving device, a third receiving device, a fifth receiving device . . . (if any)) at the odd location may use the primary 160 MHz channel as a response channel, and receiving devices (a second receiving device, a fourth receiving device, a sixth receiving device . . . (if any)) at the even location may use the secondary 160 MHz channel as a response channel. It can be learned that, for MU-MIMO transmission, in this implementation, each channel of a total bandwidth can be fully utilized, resource utilization is optimized, and transmission efficiency of the acknowledgment frame is ensured.

It may be understood that after determining the response channel 420, the receiving device 202 may determine the response resource block based on the RU allocation information. For example, a specific 80 MHz channel in the response channel may be determined based on the location B0 in the RU allocation information, and a specific RU in the 80 MHz channel is further determined based on locations B1 to B7 in the RU allocation information.

Then, the receiving device 202 may send the acknowledgment frame for the data frame to the sending device 201 on the response resource block.

In this manner, when the transmission resource block of the data frame is greater than the bandwidth threshold, the receiving device can determine the response channel based on the preset rule, and then accurately determine the response resource block based on the RU allocation information. This solution is improved. The receiving device knows a specific channel on which the acknowledgment frame is sent. In addition, the solution in this embodiment of the present disclosure does not need additional bits for indication. In this case, a format of the data frame does not need to be specially modified, and applicability is high.

Figure 8:
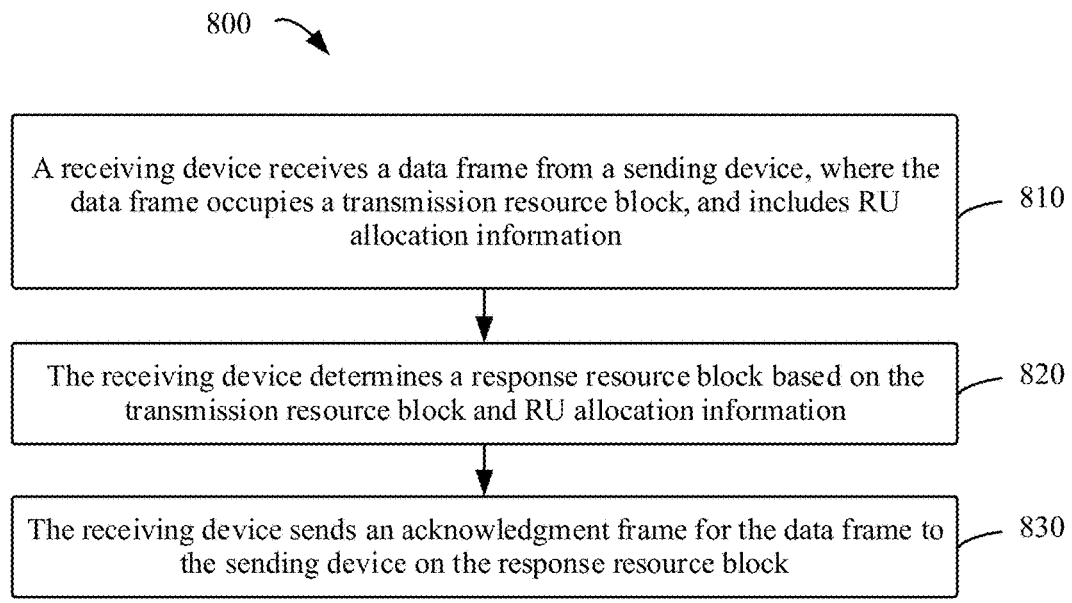
FIG. 8 is a schematic flowchart of an information transmission method 800 according to an embodiment of the present disclosure.

FIG. 8 is a schematic flowchart of an information transmission method 800 according to an embodiment of the present disclosure. As an example, the method 800 may be implemented on the receiving device 202 shown in FIG. 2. For ease of understanding, the following describes the information transmission method 800 by using the receiving device 202 as an example. However, this is only an example, and is not intended to impose any limitation on this embodiment of the present disclosure.

The method 800 begins with a block 810. At 810, the receiving device 202 receives a data frame from a sending device. The data frame occupies a transmission resource block, and includes RU allocation information.

In some embodiments, the transmission resource block may be a 4×996-tone RU, a 3×996-tone MRU, a 2×996+484-tone MRU, a 3×996+484-tone MRU, and the like. It should be understood that the foregoing examples of the transmission resource block are only illustrative and not restrictive, and another appropriate RU or MRU may also be used as the transmission resource block in this embodiment of the present disclosure.

For example, for related descriptions of the data frame from the sending device, refer to the specific embodiment described above with reference to 410. For brevity, details are not described herein again.

At 820, the receiving device 202 determines a response resource block based on the transmission resource block and RU allocation information.

In some embodiments, when a bandwidth of the transmission resource block is greater than a bandwidth threshold (for example, 320 MHz), a response channel may be determined based on a preset rule; and the response resource block may be determined based on the response channel and the RU allocation information. In this embodiment of the present disclosure, the response channel may be a response 160 MHz channel.

Optionally, the response channel may include at least one of the following: a primary 160 MHz channel, a secondary 160 MHz channel, a high 160 MHz channel, a low 160 MHz channel, or a 160 MHz channel with more data tones of the transmission resource block.

Optionally, it may be determined, based on an EHT-SIG field of the data frame, that the data frame is transmitted in MU-MIMO. A location of the receiving device 202 in a MU-MIMO user group may be determined based on an identifier of the receiving device 202 in the EHT-SIG field. The response channel may be determined based on the location.

For example, the location of the receiving device 202 in the MU-MIMO user group may be a location of the receiving device 202 in a MU-MIMO group. If the location is a predetermined location, it is determined that the response channel is a first 160 MHz channel. If the location is not a predetermined location (that is, a non-predetermined location), it is determined that the response channel is a second 160 MHz channel. Optionally, the first 160 MHz channel is different from the second 160 MHz channel.

Optionally, the first 160 MHz channel may be the primary 160 MHz channel or the secondary 160 MHz channel. Optionally, the first 160 MHz channel may be the high 160 MHz channel or the low 160 MHz channel.

In some examples, the first 160 MHz channel is the primary 160 MHz channel, and the second 160 MHz channel is the secondary 160 MHz channel. In another example, the first 160 MHz channel is the high 160 MHz channel, and the second 160 MHz channel is the low 160 MHz channel.

It may be understood that for a specific implementation of the block 820, refer to the detailed description of how the receiving device 202 determines the response resource block 420 in the process 400. For brevity, details are not described herein again.

Then, at 830, the receiving device 202 sends an acknowledgment frame for the data frame to the sending device 201 on the response resource block.

In this way, the receiving device can determine the response channel based on the preset rule, and further can correctly send the acknowledgment frame, ensuring information transmission efficiency. In some embodiments of the present disclosure, the receiving device may send a block acknowledgment frame at 830, and details are not described herein again.

Figure 9:
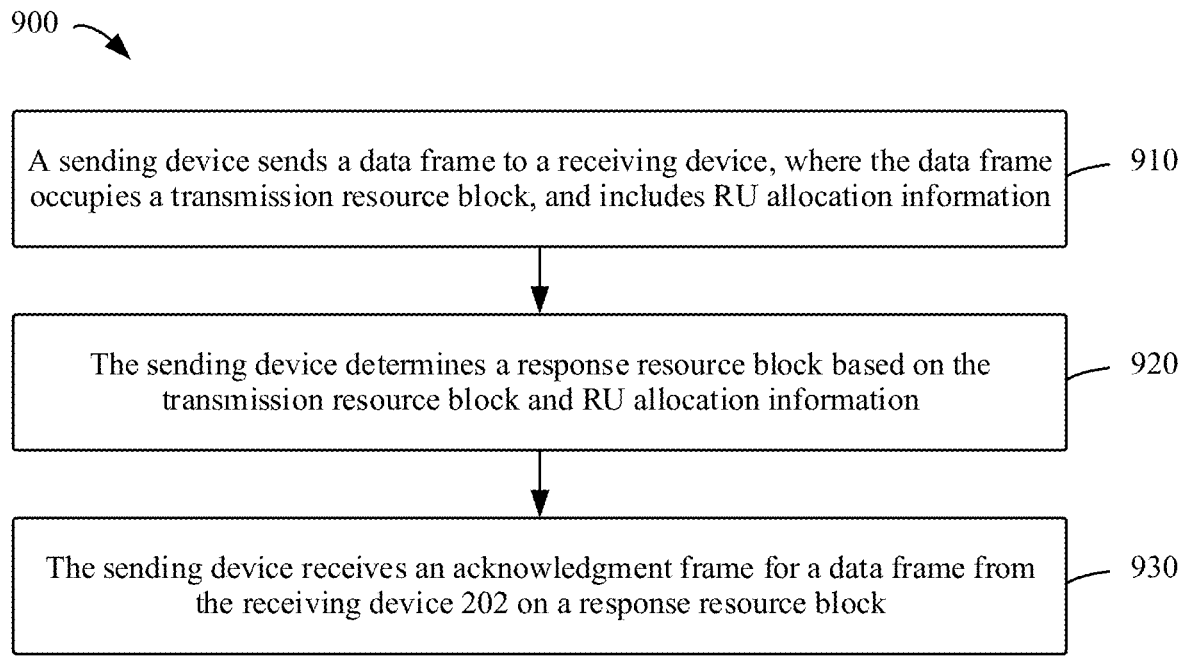
FIG. 9 is another schematic flowchart of an information transmission method 900 according to an embodiment of the present disclosure.

FIG. 9 is a schematic flowchart of an information transmission method 900 according to an embodiment of the present disclosure. As an example, the method 900 may be implemented in the sending device 201 shown in FIG. 2. For ease of understanding, the following describes the information transmission method 900 by using the sending device 201 as an example. However, this is only an example, and is not intended to impose any limitation on this embodiment of the present disclosure.

At 910, the sending device 201 sends a data frame to a receiving device, where the data frame occupies a transmission resource block, and includes RU allocation information.

In this embodiment of the present disclosure, the transmission resource block may be any one of the following: a 4×996-tone RU, a 3×996-tone MRU, a 2×996+484-tone MRU, a 3×996+484-tone MRU, and the like.

For example, for related descriptions of the data frame from the sending device, refer to the specific embodiment described above with reference to 410. For brevity, details are not described herein again.

At 920, the sending device 201 determines a response resource block based on the transmission resource block and RU allocation information.

In some embodiments, when a bandwidth of the transmission resource block is greater than a bandwidth threshold (for example, 320 MHz), a response channel may be determined based on a preset rule; and the response resource block may be determined based on the response channel and the RU allocation information. In this embodiment of the present disclosure, the response channel may be a response 160 MHz channel.

Optionally, the response channel may include at least one of the following: a primary 160 MHz channel, a secondary 160 MHz channel, a high 160 MHz channel, a low 160 MHz channel, or a 160 MHz channel with more data tones of the transmission resource block.

Optionally, it may be determined, based on an EHT-SIG field of the data frame, that the data frame is transmitted in MU-MIMO. A location of the receiving device in a MU-MIMO user group may be determined based on an identifier of the receiving device in the EHT-SIG field. The response channel may be determined based on the location.

For example, the location of the receiving device in the MU-MIMO user group may be a location of the receiving device in a MU-MIMO group. If the location is a predetermined location, it is determined that the response channel is a first 160 MHz channel. If the location is not a predetermined location (that is, a non-predetermined location), it is determined that the response channel is a second 160 MHz channel. Optionally, the first 160 MHz channel is different from the second 160 MHz channel.

Optionally, the first 160 MHz channel may be the primary 160 MHz channel or the secondary 160 MHz channel. Optionally, the first 160 MHz channel may be the high 160 MHz channel or the low 160 MHz channel.

In some examples, the first 160 MHz channel is the primary 160 MHz channel, and the second 160 MHz channel is the secondary 160 MHz channel. In another example, the first 160 MHz channel is the high 160 MHz channel, and the second 160 MHz channel is the low 160 MHz channel.

It may be understood that, for a specific implementation of 920, similarly refer to the foregoing detailed description in 420. In other words, the sending device 201 and the receiving device 202 may determine response channels and further determine response resource blocks in a similar manner. In this way, the receive end and the transmit end can ensure consistency. For brevity, details are not described herein again.

Then, at 930, the sending device 201 receives an acknowledgment frame for a data frame from the receiving device 202 on a response resource block.

In this way, the sending device can determine the response channel based on the preset rule, and further can correctly receive the acknowledgment frame, ensuring information transmission efficiency. In some embodiments of the present disclosure, the sending device may receive a block acknowledgment frame at 930, and details are not described herein again.

It should be understood that, in embodiments of the present disclosure, "first", "second", "third", and the like are only intended to indicate that a plurality of objects may be different, but two objects may be the same. The "first", "second", "third", and the like should not be construed as a limitation on embodiments of the present disclosure.

It should be further understood that division into the manners, cases, categories, and embodiments in embodiments of this application is only intended for ease of description, and should not constitute a particular limitation. The features in the manners, categories, cases, and embodiments may be combined with each other if logical.

It should be further understood that, the foregoing content is only intended to help a person skilled in the art better understand embodiments of this application, instead of limiting the scope of embodiments of this application. A person skilled in the art may make various modifications, changes, combinations, or the like according to the foregoing content. A modified, changed, or combined solution also falls within the scope of embodiments of this application.

It should be further understood that the descriptions of the foregoing content focus on emphasizing a difference between the embodiments, and for the same or similar content of the embodiments, reference may be made to each other. For simplicity, details are not further described herein.

Figure 10:
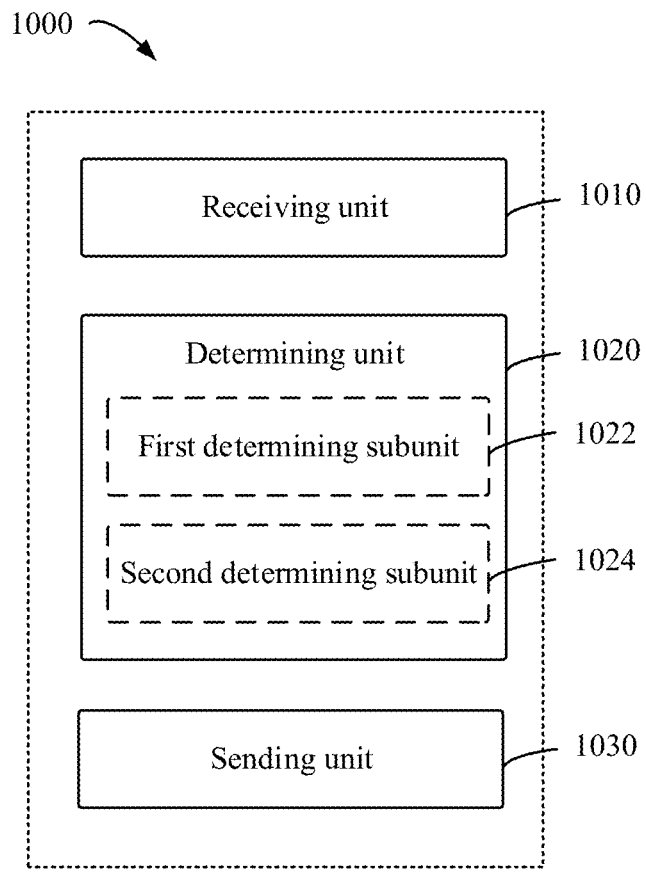
FIG. 10 is a schematic block diagram of a communication apparatus 1000 according to an embodiment of the present disclosure.

FIG. 10 is another schematic block diagram of a communication apparatus 1000 according to an embodiment of the present disclosure. The apparatus 1000 may be implemented as the receiving device 202, or may be implemented as a chip or a chip system in the receiving device 202. The scope of the present disclosure is not limited in this aspect.

As shown in FIG. 10, the apparatus 1000 may include a receiving unit 1010, a determining unit 1020, and a sending unit 1030. The receiving unit 1010 may be configured to receive a data frame from a sending device. The data frame occupies a transmission resource block, and includes RU allocation information. The determining unit 1020 may be configured to determine a response resource block based on the transmission resource block and the RU allocation information. The sending unit 1030 may be configured to send an acknowledgment frame for the data frame to the sending device on the response resource block.

In some embodiments, the transmission resource block is at least one of the following: a 2×996+484-tone MRU, a 3×996-tone MRU, a 3×996+484-tone MRU, or a 4×996-tone RU.

In some embodiments, the determining unit 1020 includes a first determining subunit 1022 and a second determining subunit 1024. The first determining subunit 1022 is configured to: if a bandwidth of the transmission resource block is greater than a bandwidth threshold, determine a response channel based on a preset rule. The second determining subunit 1024 is configured to determine the response resource block based on the response channel and the RU allocation information.

In some embodiments, the response channel includes at least one of the following: a primary 160 MHz channel, a secondary 160 MHz channel, a high 160 MHz channel, a low 160 MHz channel, or a 160 MHz channel with more data tones of the transmission resource block.

In some embodiments, the first determining subunit 1022 is configured to: determine, based on an EHT-SIG field of the data frame, that the data frame is transmitted in MU-MIMO mode; determine a location of the receiving device in a MU-MIMO user group based on an identifier of the receiving device in the EHT-SIG field; and determine the response channel based on the location.

In some embodiments, the first determining subunit 1022 is configured to: if the location is a predetermined location, determine that the response channel is a first 160 MHz channel; and if the location is a non-predetermined location, determine that the response channel is a second 160 MHz channel. The second 160 MHz channel is different from the first 160 MHz channel.

In some embodiments, the predetermined location is at least one of the following: an odd location, an even location, a first half of locations, or a second half of locations.

In some embodiments, the first 160 MHz channel is a primary 160 MHz channel or a secondary 160 MHz channel.

In some embodiments, the first 160 MHz channel is a high 160 MHz channel or a low 160 MHz channel.

For example, the apparatus 1000 in FIG. 10 may be implemented as the receiving device 202, or may be implemented as a chip or a chip system in the receiving device 202. This is not limited in this embodiment of the present disclosure. Optionally, the receiving device 202 may be a STA 32. The apparatus 1000 in FIG. 10 can be configured to implement the processes described with reference to the receiving device 202 in FIG. 4 to FIG. 9. For brevity, details are not described herein again.

Figure 11:
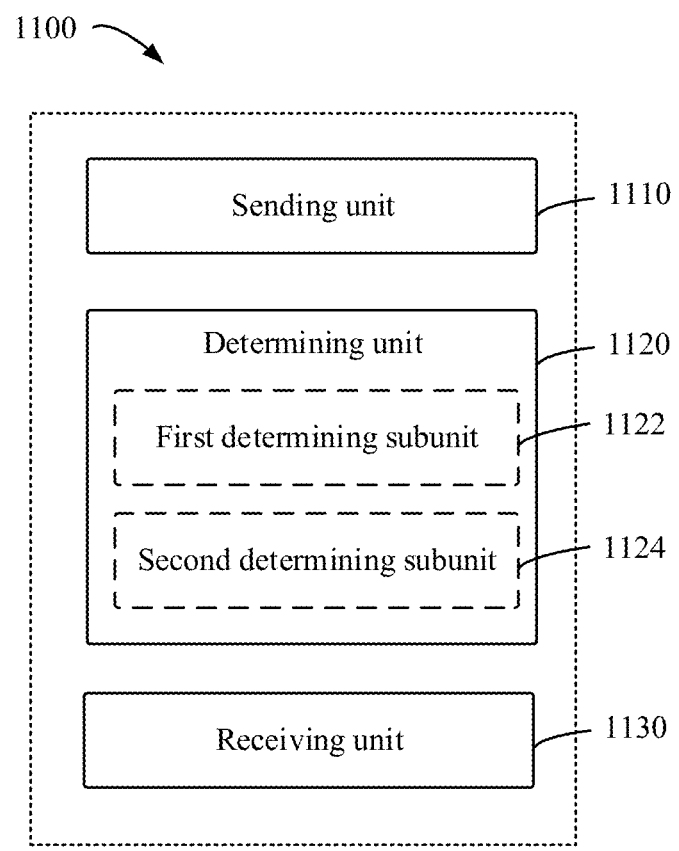
FIG. 11 is another schematic block diagram of a communication apparatus 1100 according to an embodiment of the present disclosure.

FIG. 11 is another schematic block diagram of a communication apparatus 1100 according to an embodiment of the present disclosure. The apparatus 1100 may be implemented as the sending device 201, or may be implemented as a chip or a chip system in the sending device 201. The scope of the present disclosure is not limited in this aspect.

As shown in FIG. 11, the apparatus 1100 may include a sending unit 1110, a determining unit 1120, and a receiving unit 1130. The sending unit 1110 may be configured to send a data frame to a receiving device. The data frame occupies a transmission resource block, and includes RU allocation information. The determining unit 1120 may be configured to determine a response resource block based on the transmission resource block and the RU allocation information. The receiving unit 1130 may be configured to receive an acknowledgment frame for the data frame from the receiving device on the response resource block.

In some embodiments, the transmission resource block is at least one of the following: a 2×996+484-tone MRU, a 3×996-tone MRU, a 3×996+484-tone MRU, or a 4×996-tone RU.

In some embodiments, the determining unit 1120 includes a first determining subunit 1122 and a second determining subunit 1124. The first determining subunit 1122 is configured to: if a bandwidth of the transmission resource block is greater than a bandwidth threshold, determine a response channel based on a preset rule. The second determining subunit 1124 is configured to determine the response resource block based on the response channel and the RU allocation information.

In some embodiments, the response channel includes at least one of the following: a primary 160 MHz channel, a secondary 160 MHz channel, a high 160 MHz channel, a low 160 MHz channel, or a 160 MHz channel with more data tones of the transmission resource block.

In some embodiments, the first determining subunit 1122 is configured to: determine, based on an EHT-SIG field of the data frame, that the data frame is transmitted in MU-MIMO mode; determine a location of the receiving device in a MU-MIMO user group based on an identifier of the receiving device in the EHT-SIG field; and determine the response channel based on the location.

In some embodiments, the first determining subunit 1122 is configured to: if the location is a predetermined location, determine that the response channel is a first 160 MHz channel; and if the location is a non-predetermined location, determine that the response channel is a second 160 MHz channel. The second 160 MHz channel is different from the first 160 MHz channel.

In some embodiments, the predetermined location is at least one of the following: an odd location, an even location, a first half of locations, or a second half of locations.

In some embodiments, the first 160 MHz channel is a primary 160 MHz channel or a secondary 160 MHz channel.

In some embodiments, the first 160 MHz channel is a high 160 MHz channel or a low 160 MHz channel.

For example, the apparatus 1100 in FIG. 11 may be implemented as the sending device 201, or may be implemented as a chip or a chip system in the sending device 201. This is not limited in this embodiment of the present disclosure. Optionally, the sending device 201 may be an AP 30. The apparatus 1100 in FIG. 11 can be configured to implement the processes described with reference to the sending device 201 in FIG. 4 to FIG. 9. For brevity, details are not described herein again.

Figure 12:
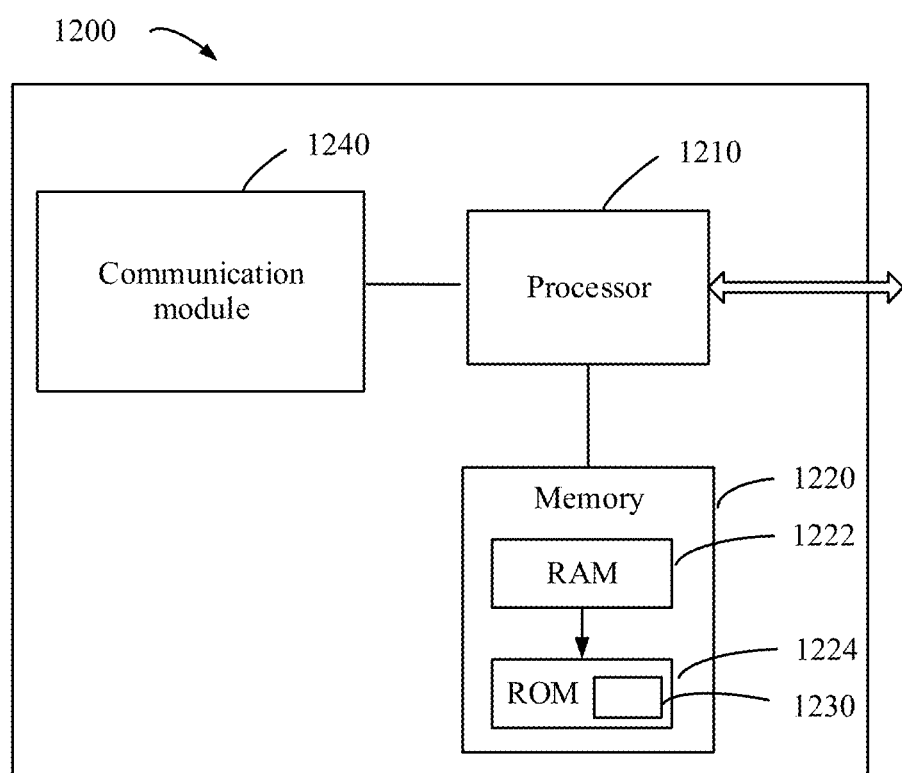
FIG. 12 is a simplified block diagram of an example apparatus 1200 according to an embodiment of the present disclosure.

FIG. 12 is a simplified block diagram of an example apparatus 1200 according to an embodiment of the present disclosure. The apparatus 1200 may be configured to implement the sending device 201 and the receiving device 202 shown in FIG. 2. The apparatus 1200 may be configured to implement the AP 30 and the STA 32 shown in FIG. 2. As shown in the figure, the apparatus 1200 includes one or more processors 1210, one or more memories 1220 coupled to the processors 1210, and a communication module 1240 coupled to the processors 1210.

The communication module 1240 may be configured to perform bidirectional communication. The communication module 1240 may have at least one communication interface for communication. The communication interface may include any interface necessary for communicating with another device.

The processor 1210 may be of any type suitable for a local technology network, and may include but is not limited to at least one of the following: one or more of a general-purpose computer, a dedicated computer, a microcontroller, a digital signal processor (DSP), or a controller-based multi-core controller architecture. The apparatus 1200 may have a plurality of processors, such as application-specific integrated circuit chips, which in time belong to a clock synchronized with a main processor.

The memory 1220 may include one or more nonvolatile memories and one or more volatile memories. An example of the nonvolatile memory includes but is not limited to at least one of the following: a read-only memory (ROM) 1224, an erasable programmable read-only memory (EPROM), a flash memory, a hard disk, a compact disc (CD), a digital versatile disc (DVD), or another magnetic storage and/or optical storage. Examples of the volatile memory include but are not limited to at least one of the following: a random access memory (RAM) 1222, or another volatile memory that does not last for power-off duration.

A computer program 1230 includes computer executable instructions executed by an associated processor 1210. The program 1230 may be stored in the ROM 1224. The processor 1210 may perform any suitable actions and processing by loading the program 1230 into the RAM 1222.

Embodiments of the present disclosure may be implemented with the help of the program 1230, so that the apparatus 1200 may perform any process discussed with reference to FIG. 3 to FIG. 9. Embodiments of the present disclosure may be alternatively implemented by using hardware or a combination of software and hardware.

In some embodiments, the program 1230 may be tangibly included in a computer-readable medium, and the computer-readable medium may be included in the apparatus 1200 (for example, in the memory 1220) or another storage device that may be accessed by the apparatus 1200. The program 1230 may be loaded from the computer-readable medium into the RAM 1222 for execution. The computer-readable medium may include any type of tangible nonvolatile memory, such as a ROM, an EPROM, a flash memory, a hard disk, a CD, a DVD, or the like.

In some embodiments, the communication module 1240 in the apparatus 1200 may be implemented as a transmitter and a receiver (or a transceiver), and may be configured to send/receive system information, such as a data frame and an acknowledgment frame. In addition, the apparatus 1200 may further include one or more of a scheduler, a controller, and a radio frequency/antenna. Details are not described in the present disclosure.

For example, the apparatus 1200 in FIG. 12 may be implemented as the sending device 201 or the receiving device 202, or may be implemented as a chip or a chip system in the sending device 201 or the receiving device 202. This is not limited in this embodiment of the present disclosure.

For example, the apparatus 1200 in FIG. 12 may be implemented as the AP 30 or the STA 32, or may be implemented as a chip or a chip system in the AP 30 and the STA 32. This is not limited in this embodiment of the present disclosure.

An embodiment of the present disclosure further provides a chip. The chip may include an input interface, an output interface, and a processing circuit. In this embodiment of the present disclosure, the input interface and the output interface may complete exchange of the foregoing signaling or data, and the processing circuit may complete generation and processing of the signaling or data information.

An embodiment of the present disclosure further provides a chip system, including a processor, configured to support the sending device 201 or the receiving device 202 in implementing the function in any one of the foregoing embodiments. In a possible design, the chip system may further include a memory. The memory is configured to store necessary program instructions and data. When the processor runs the program instructions, a device on which the chip system is installed is enabled to perform the method in any one of the foregoing embodiments. The chip system may include a chip, or may include a chip and another discrete component.

An embodiment of this application further provides a processor, configured to be coupled to a memory. The memory stores instructions. When the processor runs the instructions, the processor is enabled to perform the method and function related to the sending device 201 or the receiving device 202 in any one of the foregoing embodiments.

An embodiment of this application further provides a computer program product including instructions. When the computer program product runs on a computer, the computer is enabled to perform any method and function that are related to the sending device 201 or the receiving device 202 in any one of the foregoing embodiments.

An embodiment of this application further provides a computer-readable storage medium. The computer-readable storage medium stores computer instructions. When a processor runs the instructions, the processor is enabled to perform the method and function related to the sending device 201 or the receiving device 202 in any one of the foregoing embodiments.

An embodiment of this application further provides a wireless communication system. The system includes a transmit device and a receive device. In some examples, the system may include at least one AP and at least one STA.

Generally, various embodiments of the present disclosure may be implemented by hardware or a dedicated circuit, software, logic, or any combination thereof. Some aspects may be implemented by hardware, and other aspects may be implemented by firmware or software, and may be performed by a controller, a microprocessor, or another computing device. Although aspects of embodiments of the present disclosure are shown and illustrated as block diagrams, flowcharts, or other diagrams, it should be understood that the blocks, apparatuses, systems, technologies, or methods described in this specification may be implemented as, for example, non-limiting examples, hardware, software, firmware, dedicated circuits, logic, general-purpose hardware, controllers, other computing devices, or a combination thereof.

The present disclosure further provides at least one computer program product tangibly stored on a non-transitory computer-readable storage medium. The computer program product includes computer executable instructions, such as instructions included in a program module, executed in a device on a real or virtual target processor to perform the process/method as described above with reference to FIG. 4 to FIG. 9. Generally, the program module includes a routine, a program, a library, an object, a class, a component, a data structure, and the like that execute a particular task or implement a particular abstract data type. In various embodiments, functions of program modules may be combined or a function of a program module may be split as needed. Machine-executable instructions for the program module may be executed locally or within a distributed device. In the distributed device, the program modules may be located in local and remote storage media.

Computer program code used to implement the methods disclosed in the present disclosure may be written in one or more programming languages. The computer program code may be provided for a processor of a general-purpose computer, a dedicated computer, or another programmable data processing apparatus, so that when the program code is executed by the computer or the another programmable data processing apparatus, functions/operations specified in the flowcharts and/or block diagrams are implemented. The program code may be executed completely on a computer, partially on a computer, as an independent software package, partially on a computer and partially on a remote computer, or completely on a remote computer or server.

In a context of the present disclosure, the computer program code or related data may be carried by any appropriate carrier, so that a device, an apparatus, or a processor can perform various processing and operations described above. Examples of the carrier include a signal, a computer-readable medium, and the like. Examples of the signal may include propagating signals in electrical, optical, radio, sound, or other forms, such as carrier waves and infrared signals.

The computer-readable medium may be any tangible medium that includes or stores a program used for or related to an instruction execution system, apparatus, or device. The computer-readable medium may be a computer-readable signal medium or a computer-readable storage medium. The computer-readable medium may include but is not limited to an electronic, magnetic, optical, electromagnetic, infrared, or semiconductor system, apparatus, or device, or any suitable combination thereof. More detailed examples of the computer-readable storage medium include an electrical connection with one or more wires, a portable computer disk, a hard disk, a random access memory (RAM), a read-only memory (ROM), an erasable programmable read-only memory (EPROM or flash memory), an optical storage device, a magnetic storage device, or any suitable combination thereof.

In addition, although the operations of the methods disclosed in the present disclosure are described in a particular order in the accompanying drawings, this does not require or imply that these operations need to be performed in the particular order or that all of the shown operations need to be performed to achieve a desired result. Instead, execution orders of the steps depicted in the flowcharts may change. Addition or optionally, some steps may be omitted, a plurality of steps may be combined into one step for execution, and/or one step may be decomposed into a plurality of steps for execution. It should further be noted that features and functions of two or more apparatuses according to the present disclosure may be specified in one apparatus. On the contrary, features and functions of one apparatus described above may be further divided into a plurality of apparatuses for materialization.

The implementations of the present disclosure are described above. The foregoing descriptions are examples, are not exhaustive, and are not limited to the disclosed implementations. Many modifications and variations are apparent to a person of ordinary skill in the art without departing from the scope of the described implementations. Selection of terms used in this specification is intended to well explain implementation principles, actual application, or improvements to technologies in the market, or to enable another person of ordinary skill in the art to understand the implementations disclosed in this specification.

What is claimed is:

1. An information transmission method, comprising:
receiving, by a receiving device, a data frame from a sending device, wherein the data frame occupies a transmission resource block, wherein a bandwidth occupied by the transmission resource block is greater than 160 MHz, and the data frame comprises resource unit (RU) allocation information;
determining, by the receiving device, indication information based on a resource block size indicated by the RU allocation information and a location of a 160 MHz channel within the bandwidth occupied by the transmission resource block, wherein the 160 MHz channel has more data tones in the transmission resource block;
determining, by the receiving device, a response resource block based on the indication information and the RU allocation information; and
sending, by the receiving device, an acknowledgment frame for the data frame to the sending device on the response resource block.

2. The method according to claim 1, wherein in response to the location of the 160 MHz channel with more data tones of the transmission resource block is low 160 MHz channel and the resource block size is 2×996+484-tone, a value of the indication information is 0.

3. The method according to claim 1, wherein in response to the location of the 160 MHz channel with more data tones of the transmission resource block is high 160 MHz channel and the resource block size is 2×996+484-tone, a value of the indication information is 1.

4. The method according to claim 1, wherein in response to the location of the 160 MHz channel with more data tones of the transmission resource block is low 160 MHz channel and the resource block size is 3×996-tone or 3×996+484-tone, a value of the indication information is 1.

5. The method according to claim 1, wherein in response to the location of the 160 MHz channel with more data tones of the transmission resource block is high 160 MHz channel and the resource block size is 3×996-tone or 3×996+484-tone, a value of the indication information is 0.

6. The method according to claim 1, wherein in response to the location of the 160 MHz channel with more data tones of the transmission resource block is primary 160 MHz channel and the resource block size is RU or Multi-RU (MRU) less than or equal to 2×996-tone, a value of the indication information is 0.

7. The method according to claim 1, wherein in response to the location of the 160 MHz channel with more data tones of the transmission resource block is secondary 160 MHz channel and the resource block size is RU or MRU less than or equal to 2×996-tone, a value of the indication information is 1.

8. The method according to claim 1, wherein the data frame comprises triggered response scheduling (TRS) information, and the TRS information comprises the RU allocation information.

9. An apparatus comprising:
a memory storing executable instructions; and
a processor configured to execute the executable instructions to:
receive a data frame from a sending device, wherein the data frame occupies a transmission resource block, wherein a bandwidth occupied by the transmission resource block is greater than 160 MHz, and the data frame comprises resource unit (RU) allocation information;
determine indication information based on a resource block size indicated by the RU allocation information and a location of a 160 MHz channel within the bandwidth occupied by the transmission resource block, wherein the 160 MHz channel has more data tones of the transmission resource block;
determine a response resource block based on the indication information and the RU allocation information; and
send an acknowledgment frame for the data frame to the sending device on the response resource block.

10. The apparatus according to claim 9, wherein in response to the location of the 160 MHz channel with more data tones of the transmission resource block is low 160 MHz channel and the resource block size is 2×996+484-tone, a value of the indication information is 0.

11. The apparatus according to claim 9, wherein in response to the location of the 160 MHz channel with more data tones of the transmission resource block is high 160 MHz channel and the resource block size is 2×996+484-tone, a value of the indication information is 1.

12. The apparatus according to claim 9, wherein in response to the location of the 160 MHz channel with more data tones of the transmission resource block is low 160 MHz channel and the resource block size is 3×996-tone or 3×996+484-tone, a value of the indication information is 1.

13. The apparatus according to claim 9, wherein in response to the location of the 160 MHz channel with more data tones of the transmission resource block is high 160 MHz channel and the resource block size is 3×996-tone or 3×996+484-tone, a value of the indication information is 0.

14. The apparatus according to claim 9, wherein in response to the location of the 160 MHz channel with more data tones of the transmission resource block is primary 160 MHz channel and the resource block size is RU or Multi-RU (MRU) less than or equal to 2×996-tone, a value of the indication information is 0.

15. The apparatus according to claim 9, wherein in response to the location of the 160 MHz channel with more data tones of the transmission resource block is secondary 160 MHz channel and the resource block size is RU or MRU less than or equal to 2×996-tone, a value of the indication information is 1.

16. The apparatus according to claim 9, wherein the data frame comprises triggered response scheduling (TRS) information, and the TRS information comprises the RU allocation information.

17. A non-transitory computer readable storage medium having stored thereon executable instructions that, when executed by a processor of an apparatus, cause the apparatus to:
receive a data frame from a sending device, wherein the data frame occupies a transmission resource block, wherein a bandwidth occupied by the transmission resource block is greater than 160 MHz, and the data frame comprises resource unit (RU) allocation information;
determine indication information based on a resource block size indicated by the RU allocation information and a location of a 160 MHz channel within the bandwidth occupied by the transmission resource block, wherein the 160 MHz channel has more data tones of the transmission resource block;
determine a response resource block based on the indication information and the RU allocation information; and
send an acknowledgment frame for the data frame to the sending device on the response resource block.

18. The non-transitory computer readable storage medium according to claim 17, wherein in response to the location of the 160 MHz channel with more data tones of the transmission resource block is low 160 MHz channel and the resource block size is 2×996+484-tone, a value of the indication information is 0.

19. The non-transitory computer readable storage medium according to claim 17, wherein in response to the location of the 160 MHz channel with more data tones of the transmission resource block is high 160 MHz channel and the resource block size is 2×996+484-tone, a value of the indication information is 1.

20. The non-transitory computer readable storage medium according to claim 17, wherein in response to the location of the 160 MHz channel with more data tones of the transmission resource block is low 160 MHz channel and the resource block size is 3×996-tone or 3×996+484-tone, a value of the indication information is 1.

* * * * *